(12) United States Patent
Jung et al.

(10) Patent No.: US 10,496,205 B2
(45) Date of Patent: Dec. 3, 2019

(54) TOUCH SENSING SYSTEM AND METHOD OF DRIVING THE SAME

(71) Applicant: LG Display Co., Ltd., Seoul (KR)

(72) Inventors: Doyoung Jung, Seoul (KR); Hyunwoo Jang, Goyang-si (KR); Hyunguk Jang, Paju-si (KR); Sanghyuck Bae, Paju-si (KR); Suyun Ju, Gangwon-do (KR)

(73) Assignee: LG Display Co., Ltd., Seoul (KR)

(*) Notice: Subject to any disclaimer, the term of this patent is extended or adjusted under 35 U.S.C. 154(b) by 107 days.

(21) Appl. No.: 15/824,928

(22) Filed: Nov. 28, 2017

(65) Prior Publication Data

US 2018/0181241 A1    Jun. 28, 2018

(30) Foreign Application Priority Data

Dec. 28, 2016 (KR) .................... 10-2016-0181111

(51) Int. Cl.
| | | |
|---|---|---|
| *G06F 3/041* | (2006.01) | |
| *G06F 3/044* | (2006.01) | |
| *G06F 3/0488* | (2013.01) | |
| *G06F 3/0354* | (2013.01) | |
| *G09G 3/20* | (2006.01) | |

(52) U.S. Cl.
CPC ........ *G06F 3/0412* (2013.01); *G06F 3/03545* (2013.01); *G06F 3/0416* (2013.01); *G06F 3/0488* (2013.01); *G06F 2203/04104* (2013.01); *G06F 2203/04808* (2013.01); *G09G 3/2022* (2013.01)

(58) Field of Classification Search
CPC ... G09G 3/2022; G06F 3/03545; G06F 3/041; G06F 3/0412; G06F 3/0416; G06F 3/044; G06F 3/0488; G06F 2203/04104; G06F 2203/04808
See application file for complete search history.

(56) References Cited

U.S. PATENT DOCUMENTS

| | | | | |
|---|---|---|---|---|
| 7,206,737 | B2 * | 4/2007 | Seto | G06F 3/03545 178/19.02 |
| 8,674,958 | B1 * | 3/2014 | Kravets | G06F 3/044 345/173 |
| 8,810,263 | B1 * | 8/2014 | Wilson | G01R 27/26 324/658 |
| 10,261,605 | B2 * | 4/2019 | Kremin | G06F 3/03545 |
| 2008/0062140 | A1 * | 3/2008 | Hotelling | G09G 3/3648 345/173 |
| 2009/0278794 | A1 * | 11/2009 | McReynolds | G06F 3/0421 345/156 |

(Continued)

*Primary Examiner* — Michael J Eurice
(74) *Attorney, Agent, or Firm* — Fenwick & West LLP

(57) ABSTRACT

A touch sensing system and a method of driving the same are disclosed. The touch sensing system includes a touch screen integrated display panel provided with a plurality of touch sensors and a plurality of pixels, a timing controller time-dividing one display frame into a plurality of touch periods and a plurality of display periods, a microcontroller unit dividing a sensing mode of the plurality of touch sensors into a full scan mode and a local scan mode, and a touch integrated circuit (IC) sensing a finger touch input of the touch sensors through the touch periods in the full scan mode and time-division sensing a finger touch input and a pen touch input of the touch sensors through the touch periods in the local scan mode.

16 Claims, 22 Drawing Sheets

| LHB | M1 | M2 | M3 | M4 | M5 | M6 | M7 | M8 | M9 | M10 | M11 | M12 | M13 | M14 | M15 | M16 |
|---|---|---|---|---|---|---|---|---|---|---|---|---|---|---|---|---|
| Panel | Beacon | Pen1 | Data1 | Finger1 | Pen2 | Data2 | Data3 | Finger2 | Pen3 | Data4 | Data5 | Finger3 | Pen4 | Data6 | Data7 | Finger4 |
| Mode | Pen detected and local scan mode ||||||||||||||||

(56) References Cited

U.S. PATENT DOCUMENTS

| | | | | |
|---|---|---|---|---|
| 2010/0214232 A1* | 8/2010 | Chan | G06F 3/044 | 345/173 |
| 2011/0157077 A1* | 6/2011 | Martin | G06F 3/0418 | 345/174 |
| 2012/0013555 A1* | 1/2012 | Maeda | G06F 3/03545 | 345/173 |
| 2012/0068964 A1* | 3/2012 | Wright | G06F 3/03545 | 345/174 |
| 2012/0105362 A1* | 5/2012 | Kremin | G06F 3/03545 | 345/174 |
| 2012/0154324 A1* | 6/2012 | Wright | G06F 3/0416 | 345/174 |
| 2013/0187888 A1* | 7/2013 | Tomita | G06F 3/044 | 345/174 |
| 2013/0207938 A1* | 8/2013 | Ryshtun | G06F 3/0416 | 345/179 |
| 2014/0152582 A1* | 6/2014 | Agarwal | G06F 3/0418 | 345/173 |
| 2014/0240298 A1* | 8/2014 | Stern | G06F 3/0383 | 345/179 |
| 2015/0002421 A1* | 1/2015 | Kim | G06F 3/041 | 345/173 |
| 2015/0242043 A1* | 8/2015 | Oda | G06F 3/044 | 345/174 |
| 2016/0179242 A1* | 6/2016 | Shepelev | G06F 3/044 | 345/174 |
| 2016/0179249 A1* | 6/2016 | Ballan | G06F 3/0416 | 345/174 |
| 2016/0252981 A1* | 9/2016 | Chang | G06F 3/0383 | 345/179 |
| 2016/0370915 A1* | 12/2016 | Agarwal | G06F 3/0416 | |
| 2016/0378208 A1* | 12/2016 | Shahparnia | G06F 3/03545 | 345/173 |
| 2017/0147140 A1* | 5/2017 | Kosugi | G06F 1/163 | |
| 2017/0192549 A1* | 7/2017 | Katayama | G06F 3/041 | |
| 2017/0242502 A1* | 8/2017 | Gray | G06F 3/0346 | |
| 2017/0357367 A1* | 12/2017 | Katsuta | G06F 3/0416 | |
| 2017/0357368 A1* | 12/2017 | Katsuta | G06F 3/046 | |
| 2018/0052548 A1* | 2/2018 | Katsuta | G02F 1/13338 | |
| 2018/0059461 A1* | 3/2018 | Katsuta | G02F 1/13338 | |

\* cited by examiner

FIG. 15

| LHB | M1 | M2 | M3 | M4 | M5 | M6 | M7 | M8 | M9 | M10 | M11 | M12 | M13 | M14 | M15 | M16 |
|---|---|---|---|---|---|---|---|---|---|---|---|---|---|---|---|---|
| Panel | Beacon | Finger1 | Finger2 | Finger3 | Finger4 | Finger5 | Finger6 | Beacon | Finger1 | Finger2 | Finger3 | Finger4 | Finger5 | Finger6 | -- | -- |
| Mode | \multicolumn{16}{l}{Pen detected and local scan mode} |

FIG. 18

| LHB | M1 | M2 | M3 | M4 | M5 | M6 | M7 | M8 | M9 | M10 | M11 | M12 | M13 | M14 | M15 | M16 |
|---|---|---|---|---|---|---|---|---|---|---|---|---|---|---|---|---|
| Panel | Beacon | Pen1 | Data1 | Finger1 | Pen2 | Data2 | Data3 | Finger2 | Pen3 | Data4 | Data5 | Finger3 | Pen4 | Data6 | Data7 | Finger4 |
| Mode | | | | | | Pen detected and local scan mode | | | | | | | | | | |

[M2, 3]    [M5, 6, 7]

[M9, 10, 11]    [M13, 14, 15]

[M4]  [M8]

[M12]  [M16]

TOUCH SENSING SYSTEM AND METHOD OF DRIVING THE SAME

CROSS-REFERENCE TO RELATED APPLICATIONS

This application claims the benefit of Republic of Korea Patent Application No. 10-2016-0181111 filed on Dec. 28, 2016, which is incorporated herein by reference in its entirety.

BACKGROUND

Field of Technology

The present disclosure relates to a touch sensing system, and more particularly, to a touch sensing system and a method of driving the same capable of performing a touch input using an active stylus pen.

Discussion of the Related Art

User interface (UI) is configured so that users are able to communicate with various electronic devices and thus can easily and comfortably control the electronic devices as they desire. Examples of the user interface include a keypad, a keyboard, a mouse, an on-screen display (OSD), and a remote controller having an infrared communication function or a radio frequency (RF) communication function. User interface technology has continuously expanded to increase user's sensibility and handling convenience. The user interface has been recently developed to include touch UI, voice recognition UI, 3D UI, etc.

A touch UI has been necessarily adopted to portable information appliances. The touch UI is implemented by forming a touch screen on the screen of a display device. The touch screen may be implemented as a capacitive touch screen. The touch screen having capacitive touch sensors senses changes (i.e., changes in charges of the touch sensor) in a capacitance resulting from an input of a touch driving signal when a user touches (or approaches) the touch sensor with his or her finger or a conductive material, and thus detects a touch input.

The capacitive touch sensors may be implemented as self-capacitance touch sensors or mutual capacitance touch sensors. Electrodes of the self-capacitance touch sensor may be respectively connected to sensor lines formed along one direction. The mutual capacitance touch sensor may be formed at an intersection of sensor lines that are perpendicular to each other with a dielectric layer interposed therebetween.

A stylus pen as well as fingers have been recently used as a human interface device (HID) in smart phones, smart books, and the like. The stylus pen is advantageous to perform more detailed inputs than the fingers. Examples of the stylus pen include a passive stylus pen and an active stylus pen. It is difficult for the passive stylus pen to detect a touch position of a touch screen contacting the passive stylus pen because there is a small change in a capacitance at the touch position. Compared with the passive stylus pen, it is easier for the active stylus pen to detect a touch position of the touch screen contacting the active stylus pen because the active stylus pen generates a pen transmission signal by itself and outputs the pen transmission signal at the touch position.

As shown in FIG. 1, a related art method senses a touch input using an active stylus pen and a touch input using a finger with respect to a touch screen at the same time. In FIG. 1, "LHB" denotes a touch period in which a touch sensing operation is performed, and a plurality of touch periods M1 to M16 may be included in one display frame. The active stylus pen receives a touch driving signal from a touch screen TSP, generates a pen transmission signal Tx synchronized with the touch driving signal, and outputs the pen transmission signal Tx at a contact position between the touch screen TSP and the active stylus pen. A touch integrated circuit (IC) senses changes in charges in accordance with the pen transmission signal Tx and the touch driving signal of touch sensors provided on the touch screen TSP and detects a touch input.

As shown in FIGS. 2A to 2D, a sensing output (hereinafter referred to as "finger touch sensing signal") of the touch sensors resulting from the touch driving signal and a sensing output (hereinafter referred to as "pen touch sensing signal") of the touch sensors resulting from the pen transmission signal Tx appear in opposite directions. For example, the finger touch sensing signal may appear in a positive (+) direction with respect to a base line "0", and the pen touch sensing signal may appear in a negative (−) direction with respect to the base line "0".

Because the related art senses the touch input of the active stylus pen and the touch input of the finger at the same time, data interference may occur between the pen touch sensing signal and the finger touch sensing signal, thereby reducing a touch sensing performance.

Further, because the related art senses the touch input of the active stylus pen and a touch input of the finger at the same time, it is difficult to increase a pen touch report rate.

SUMMARY

The present disclosure provides a touch sensing system and a method of driving the same capable of improving a touch sensing performance and increasing a pen touch report rate by minimizing data interference between a pen touch sensing signal and a finger touch sensing signal when sensing a touch input using an active stylus pen and a touch input using a finger with respect to a touch screen.

In one aspect, there is provided a touch sensing system comprising a touch screen integrated display panel provided with a plurality of touch sensors and a plurality of pixels, a timing controller configured to time-divide one display frame into a plurality of touch periods and a plurality of display periods, a microcontroller unit configured to divide a sensing mode of the plurality of touch sensors into a full scan mode and a local scan mode, and a touch integrated circuit (IC) configured to sense a finger touch input of the touch sensors through the touch periods in the full scan mode and time-division sense a finger touch input and a pen touch input of the touch sensors through the touch periods in the local scan mode.

A magnitude of a finger touch sensing signal resulting from the finger touch input and a magnitude of a pen touch sensing signal resulting from the pen touch input appear in opposite directions based on a predetermined reference value.

The microcontroller unit switches the sensing mode of the touch sensors from the full scan mode to the local scan mode when the pen touch sensing signal is sensed during the full scan mode. The microcontroller unit switches the sensing mode of the touch sensors from the local scan mode to the full scan mode when the pen touch sensing signal is not sensed during the local scan mode.

In the full scan mode, the touch IC divides the finger touch input of the touch sensors into a plurality of areas and senses the finger touch input. The plurality of areas corresponds to the touch periods.

In the local scan mode, the touch IC senses only the pen touch input of some of the touch sensors including a position of the pen touch input.

The pen touch sensing signal includes pen position information indicating a contact position of the touch sensors contacting a pen, and pen additional information indicating an additional function of the pen. The pen additional information includes pen pressure information when the pen contacts the touch sensors, button status information indicating whether or not at least one functional button that is included in the pen and performs a specific function is activated, and pen identification information for distinguishing from other pens.

In the local scan mode, the touch IC senses the pen touch input through touch periods for the pen position information and touch periods for the pen additional information among the plurality of touch periods.

In the local scan mode, the touch IC divides the finger touch input of the touch sensors into a plurality of areas and senses the finger touch input through touch periods for finger position information among the plurality of touch periods. The plurality of areas corresponds to the touch periods for the finger position information.

The microcontroller unit generates pulse width modulation (PWM) signals respectively corresponding to a first sync signal, a second sync signal, and a touch driving signal. The first sync signal is allocated to at least one of the plurality of touch periods. The second sync signal is allocated to a portion of each of the plurality of touch periods. The touch driving signal is allocated to a remaining portion of each of the plurality of touch periods.

In another aspect, there is provided a method of driving a touch sensing system including a touch screen integrated display panel provided with a plurality of touch sensors and a plurality of pixels, the method comprising time-dividing one display frame into a plurality of touch periods and a plurality of display periods, dividing a sensing mode of the plurality of touch sensors into a full scan mode and a local scan mode, and sensing a finger touch input of the touch sensors through the touch periods in the full scan mode and time-division sensing a finger touch input and a pen touch input of the touch sensors through the touch periods in the local scan mode.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings:

FIG. 15 illustrates a sensing signal obtained in each touch period of one display frame in a full scan mode according to an embodiment of the disclosure;

FIG. 18 illustrates a sensing signal obtained in each touch period of one display frame in a local scan mode according to an embodiment of the disclosure;

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the disclosure.

[Touch Sensing System]

Figure 1:
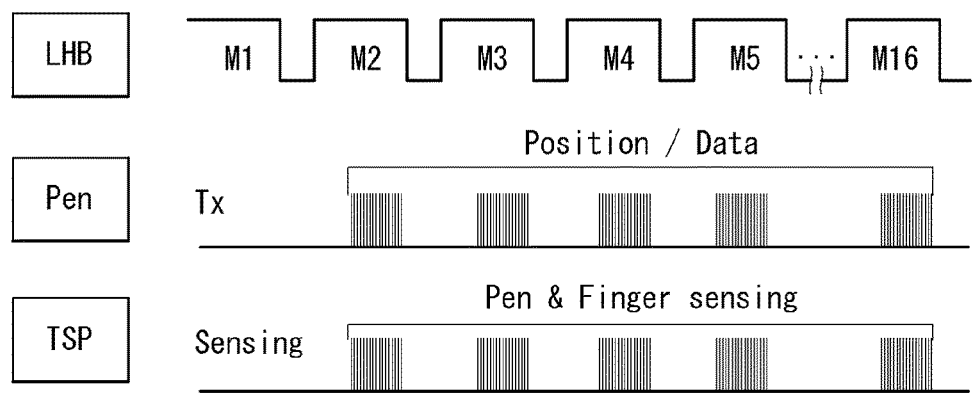
FIG. 1 illustrates a related art method of sensing a touch input using an active stylus pen and a touch input using a finger with respect to a touch screen at the same time.
Figure 2A:
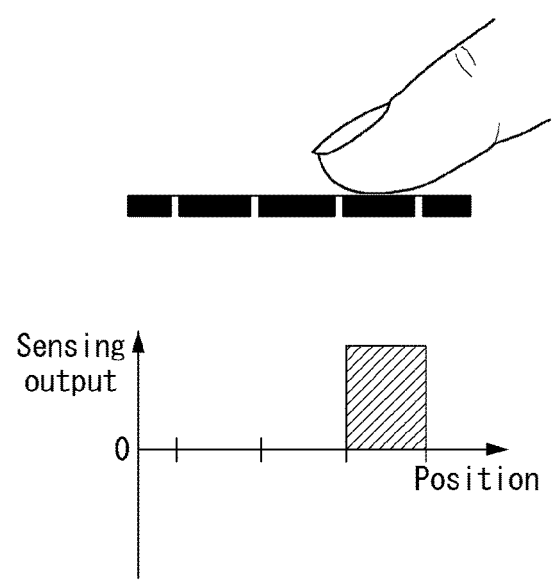
FIGS. 2A to 2D illustrate various examples of related art when a pen touch sensing signal and a finger touch sensing signal appear in opposite directions with respect to a base line.
Figure 2B:
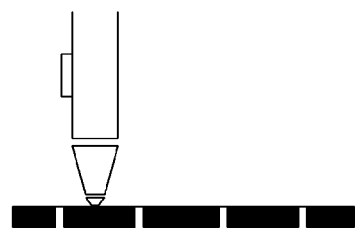
Figure 2B:
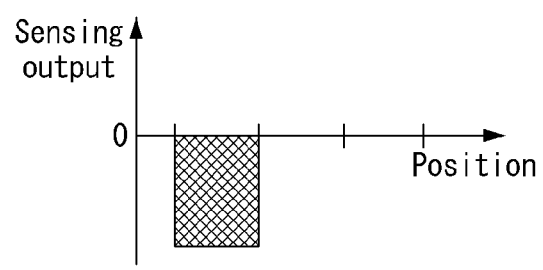
Figure 2C:
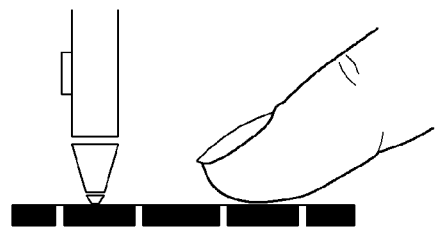
Figure 2C:
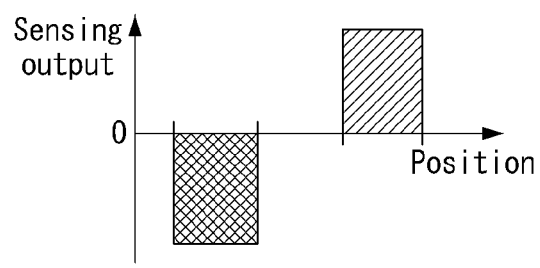
Figure 2D:
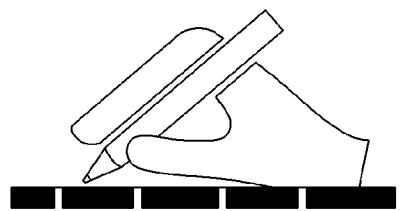
Figure 2D:
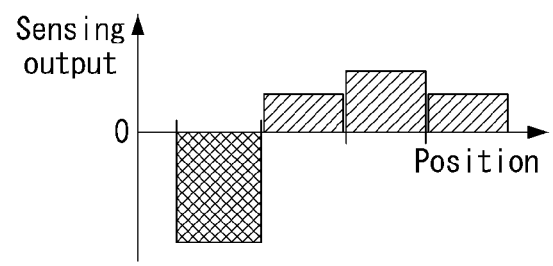
Figure 3:
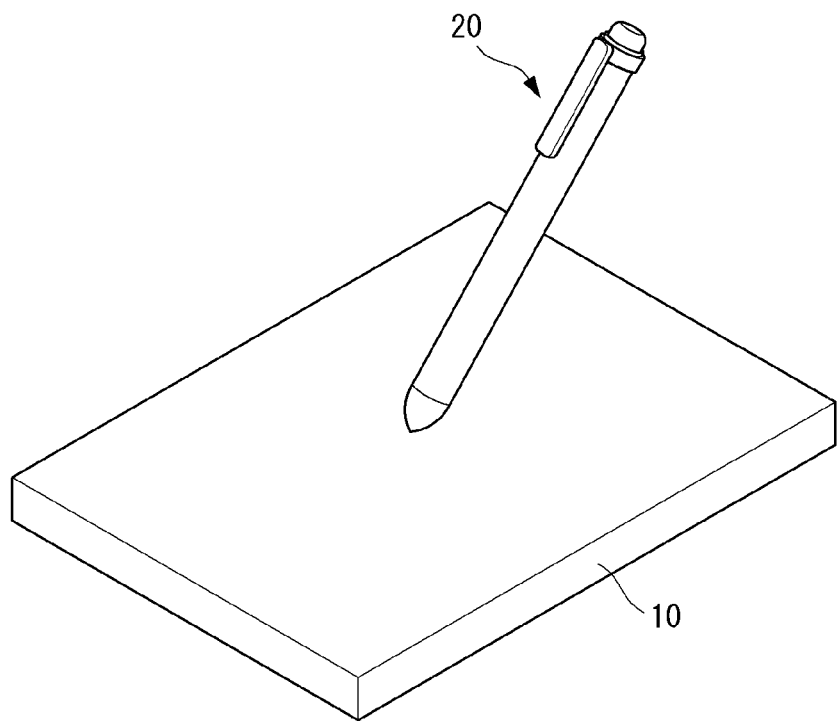
FIG. 3 schematically illustrates a touch sensing system according to an embodiment of the disclosure.

FIG. 3 schematically illustrates a touch sensing system according to an embodiment of the disclosure.

Referring to FIG. 3, a touch sensing system according to an embodiment of the disclosure includes a display device 10 and an active stylus pen 20.

The display device 10 performs a display function and a touch detection function. The display device 10 is capable to detect a touch input of a conductive object, such as a finger or the active stylus pen 20, and includes an integrated capacitive touch screen embedded therein. In embodiment disclosed herein, the touch screen may be configured independently of a display panel and may be embedded in a pixel array of the display panel. Detailed configuration and operation of the display device 10 will be described later with reference to FIGS. 4 to 11.

The active stylus pen 20 generates a pen transmission signal including pen additional information in synchronization with a touch driving signal received from the touch screen and outputs the pen transmission signal at a contact position between the touch screen and the active stylus pen 20, thereby easily detecting a touch position on the touch screen. The touch sensing system analyzes changes in touch raw data according to the pen transmission signal and senses a position of a touch input using the active stylus pen 20 and the pen additional information. The pen additional information may include pen pressure information indicating a pressure when the active stylus pen contacts the touch sensors, button status information indicating whether or not at least one functional button that is included in the active stylus pen and performs a specific function is activated, pen identification information for distinguishing from other active stylus pens, and the like.

Configuration and operation of the active stylus pen 20 will be described later with reference to FIGS. 10 to 15.

[Display Device]

Figure 4:
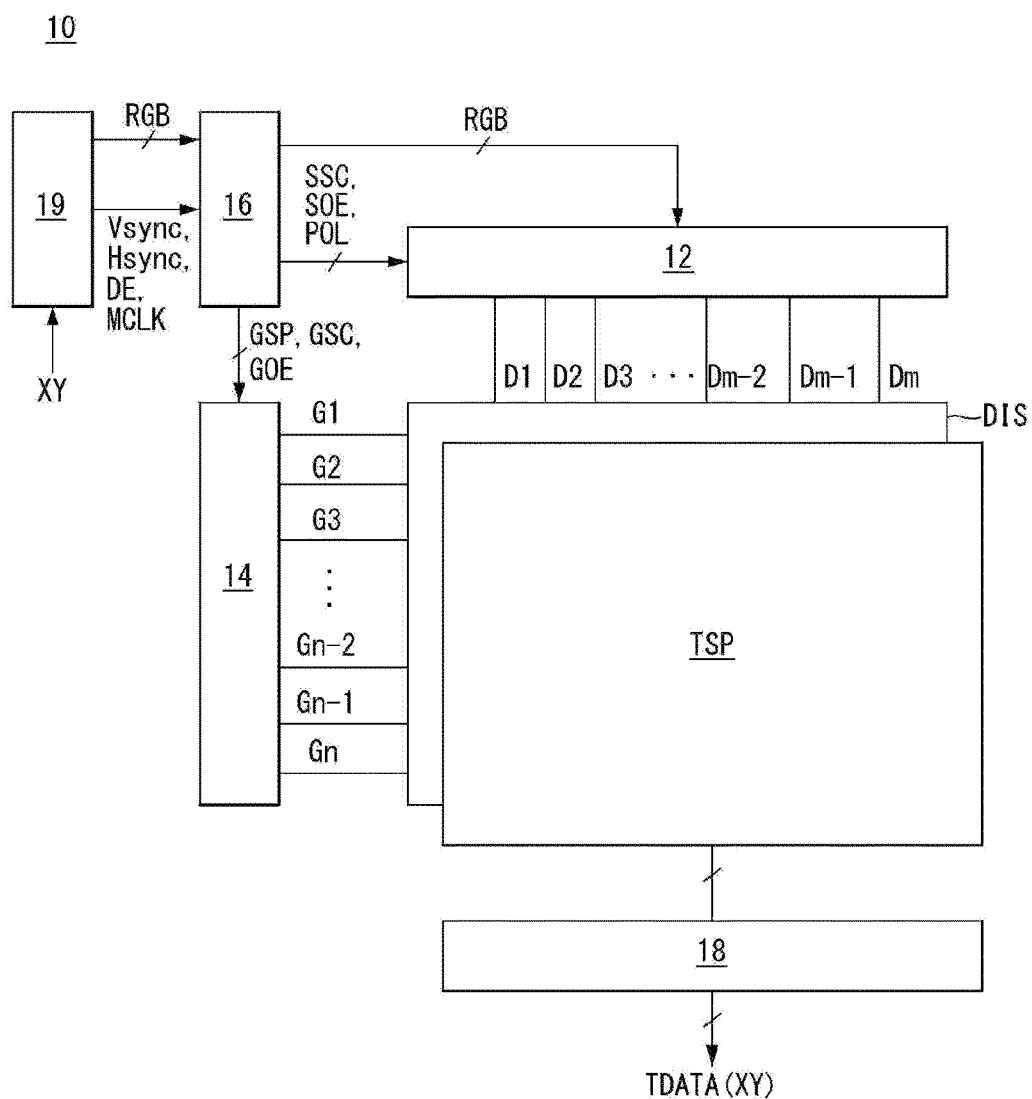
FIG. 4 illustrates a display device to which a touch sensing system according to an embodiment of the disclosure is applied.
Figure 5:
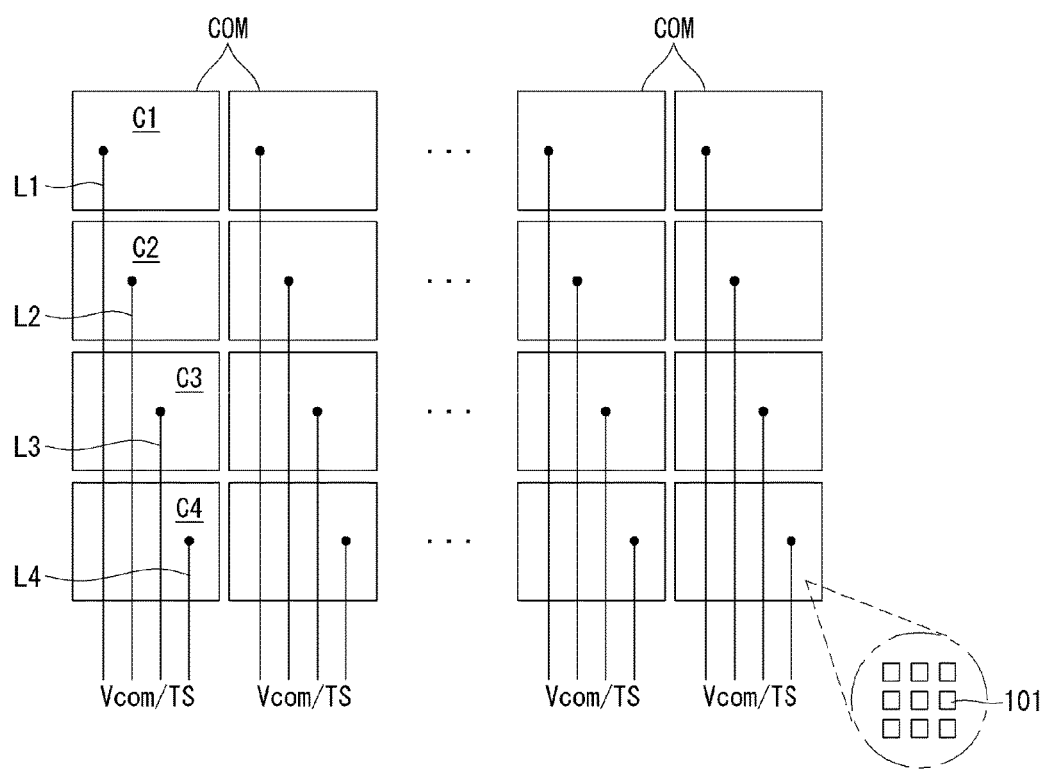
FIG. 5 illustrates an example where touch sensors of a touch screen are embedded in a pixel array of a display panel according to an embodiment of the disclosure.
Figure 6:
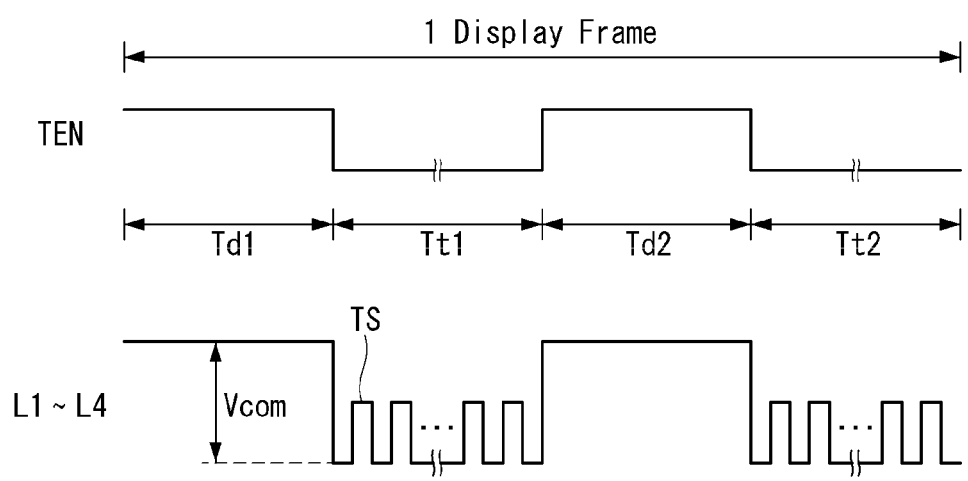
FIG. 6 is a timing diagram illustrating a method of time-division driving pixels of a display panel and touch sensors in a touch sensor embedded pixel array according to an embodiment of the disclosure.
Figure 7:
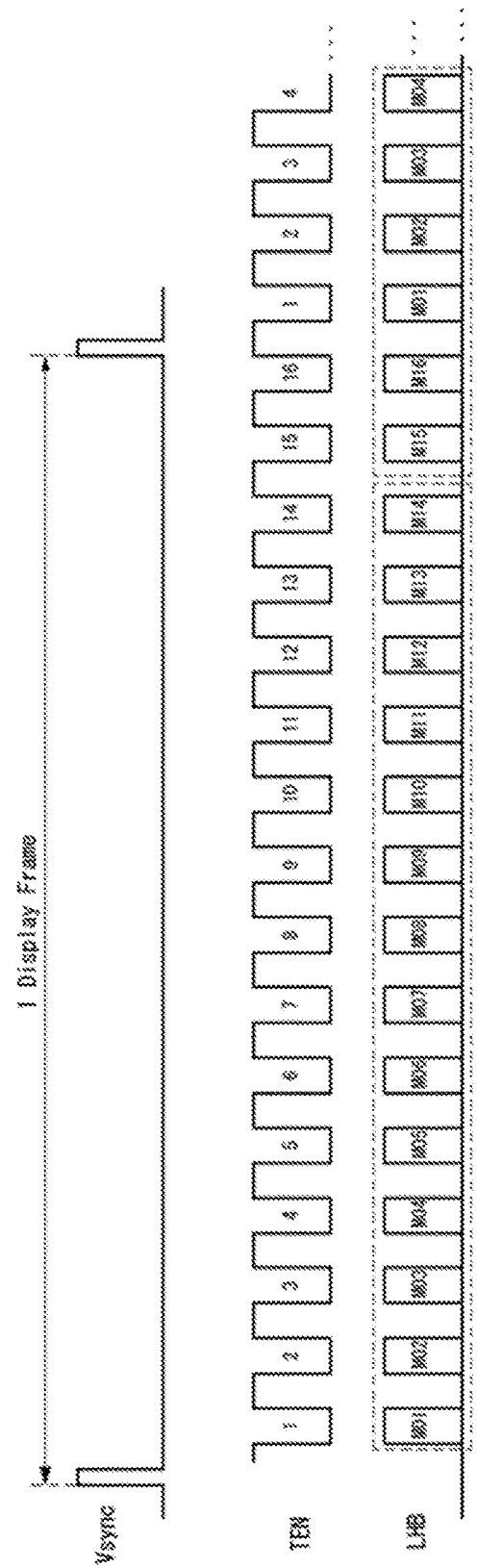
FIG. 7 illustrates an example where a plurality of touch periods is included in one display frame according to an embodiment of the disclosure.
Figure 8:
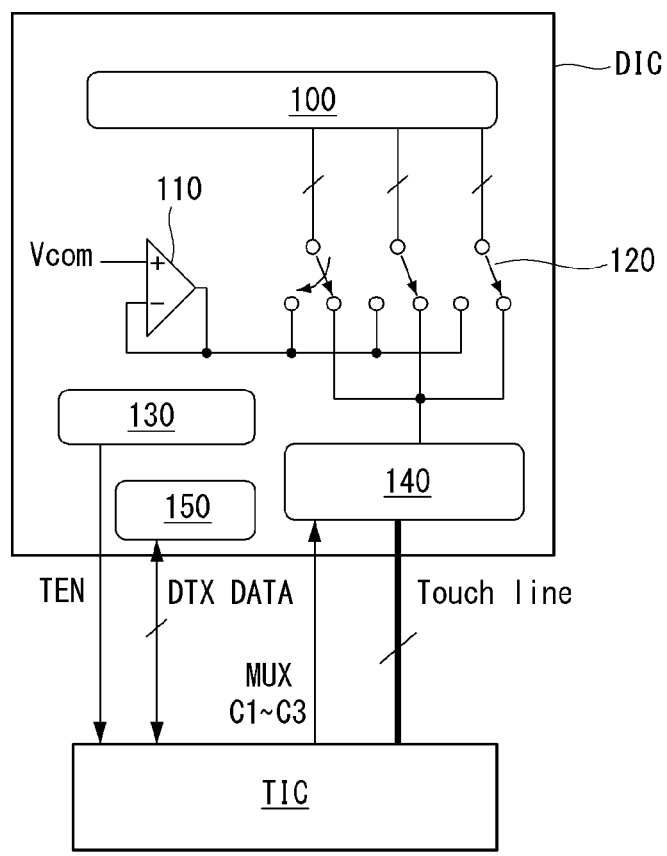
FIGS. 8 to 10 illustrate a touch driving device according to an embodiment of the disclosure.
Figure 9:
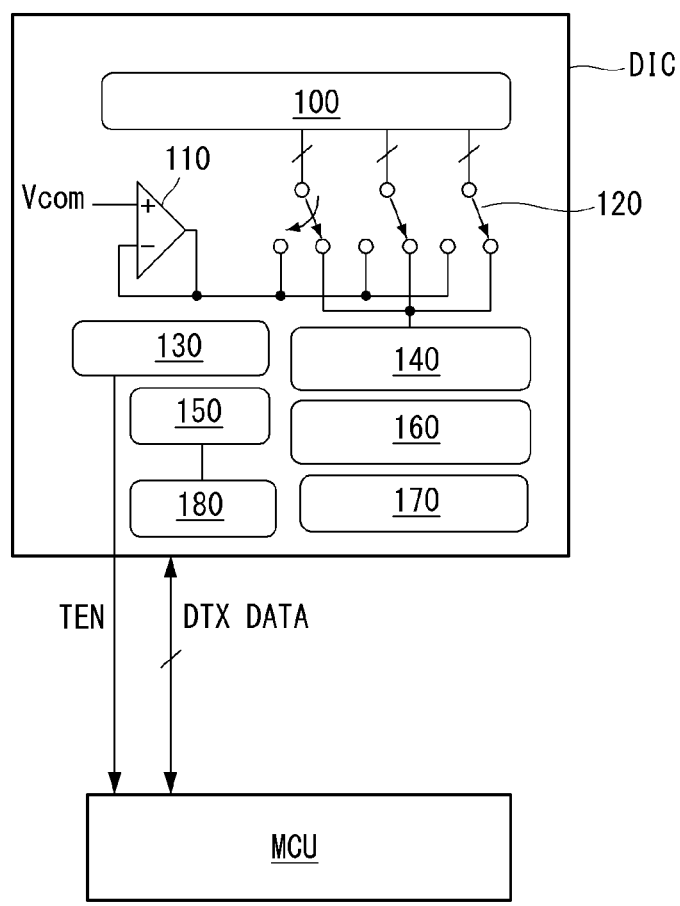
Figure 10:
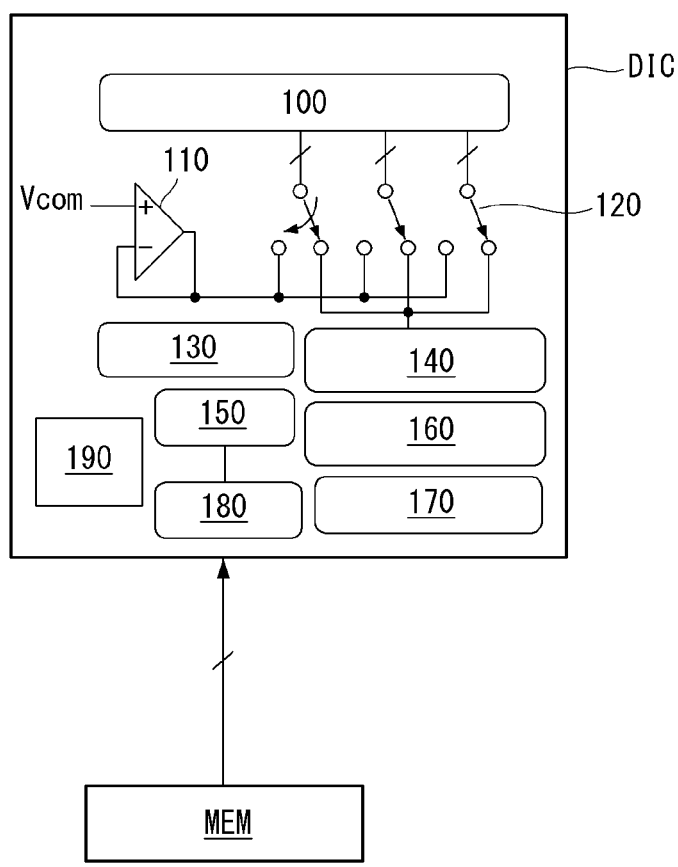
Figure 11:
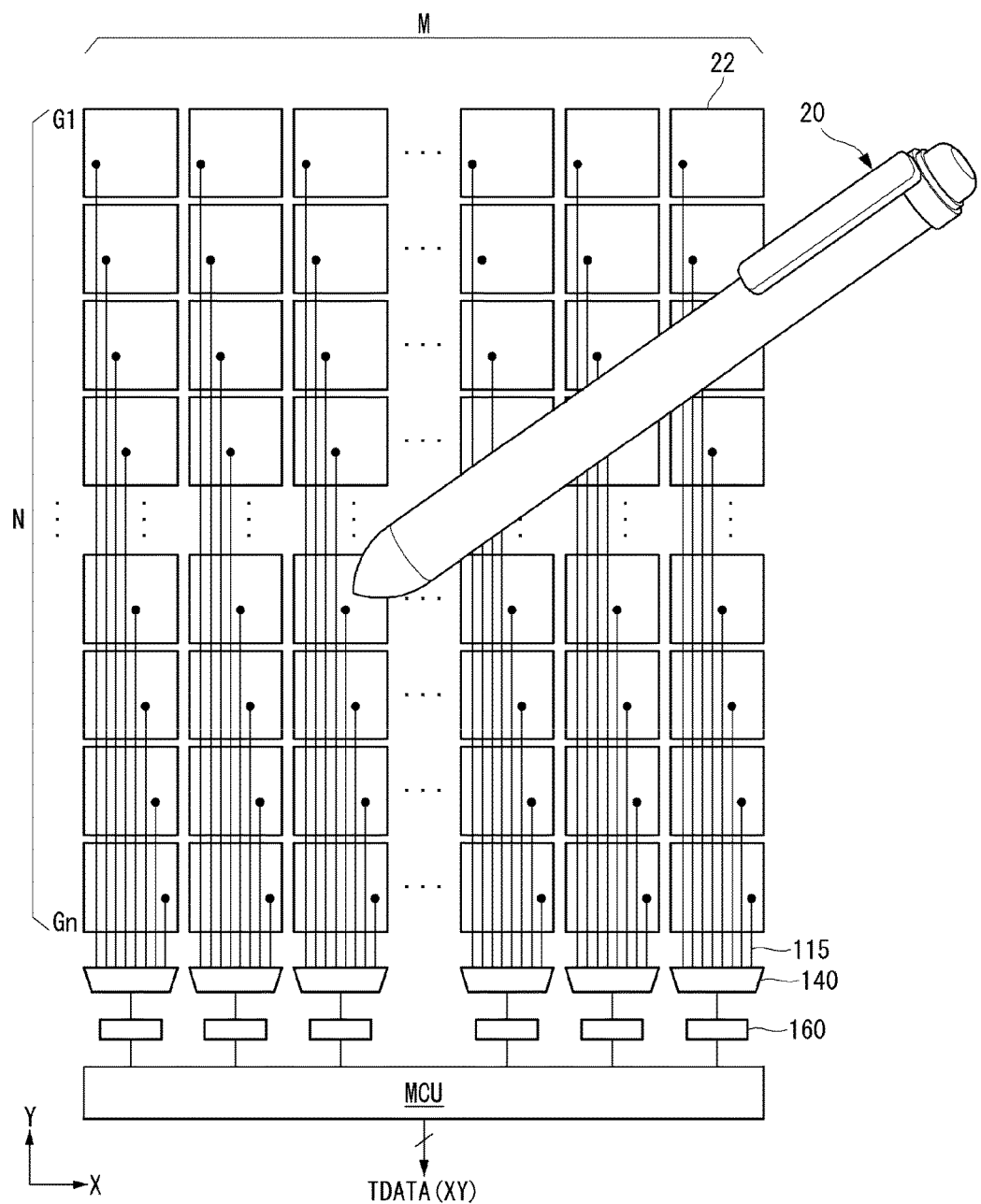
FIG. 11 illustrates multiplexers connected to touch sensor blocks and sensing units according to an embodiment of the disclosure.

FIG. 4 illustrates a display device to which a touch sensing system according to an embodiment of the disclosure is applied. FIG. 5 illustrates an example where touch sensors of a touch screen are embedded in a pixel array of a display panel. FIG. 6 illustrates a method of time-division driving pixels of a display panel and touch sensors in a touch sensor embedded pixel array. FIG. 7 illustrates an example where a plurality of touch periods is included in one display frame. FIGS. 8 to 10 illustrate a touch driving device according to an embodiment of the disclosure. FIG. 11 illustrates multiplexers connected to touch sensor blocks and sensing units.

Referring to FIGS. 4 to 11, a display device 10 according to an embodiment of the disclosure may be implemented based on a flat panel display, such as a liquid crystal display (LCD), a field emission display (FED), a plasma display panel (PDP), an organic light emitting diode (OLED) display, and an electrophoresis display (EPD). In the following description, embodiments of the disclosure will be described using a liquid crystal display as an example of a flat panel display. However, embodiments are not limited thereto, and other flat panel displays may be used.

The display device 10 includes a display module and a touch module.

The touch module includes a touch screen TSP and a touch driving device 18.

The touch screen TSP may be implemented in a capacitive method of sensing a touch input through a plurality of capacitive sensors. The touch screen TSP includes a plurality of touch sensors each having a capacitance. The capacitance may be divided into a self-capacitance and a mutual capacitance. The self-capacitance may be formed along a conductor line of a single layer formed in one direction, and the mutual capacitance may be formed between two conductor lines perpendicular to each other.

The touch sensors of the touch screen TSP may be embedded in a pixel array of a display panel DIS. FIG. 5 illustrates an example where the touch screen TSP is embedded in the pixel array of the display panel DIS. Referring to FIG. 5, the pixel array of the display panel DIS includes touch sensors C1 to C4 and sensor lines L1 to Li (e.g., L4) connected to the touch sensors C1 to C4, where "i" is a positive integer. A common electrode COM of a plurality of pixels 101 is divided into a plurality of segments. The touch sensors C1 to C4 are implemented as the divided common electrodes COM. One common electrode segment is commonly connected to the plurality of pixels 101 and forms one touch sensor. The touch sensor serves as a display electrode of the pixels 101. Thus, as shown in FIG. 6, the touch sensors C1 to C4 supply a common voltage Vcom to the pixels 101 during display periods Td1 and Td2 for image display. During touch periods Tt1 and Tt2, the touch sensors C1 to C4 receive a touch driving signal TS and sense a touch input. FIG. 5 illustrates self-capacitance touch sensors, by way of example. Embodiments are not limited thereto. Other types of touch sensors may be used.

The touch driving device 18 applies the touch driving signal TS to the touch sensors C1 to C4 and senses a change in charges of the touch sensors C1 to C4 before and after a touch operation. Hence, the touch driving device 18 determines whether or not the touch operation using a conductive material, such as a finger and a stylus pen, is performed and a location of the touch operation.

The touch driving device 18 drives the touch sensors in response to a touch enable signal TEN received from a timing controller 16 or a host system 19 during the touch periods Tt1 and Tt2. During the touch periods Tt1 and Tt2, the touch driving device 18 supplies the touch driving signal TS to the touch sensors C1 to C4 through the sensor lines L1 to L4 and senses the touch input. The touch driving device 18 analyzes a change in charges of the touch sensors before and after the touch operation, determines whether or not the touch input is received, and calculates coordinates of a location of the touch input. The coordinates of the location of the touch input are transmitted to the host system 19.

The touch driving device 18 drives the touch sensors C1 to C4 in response to the touch enable signal TEN during the touch periods Tt1 and Tt2. As shown in FIG. 7, the touch driving device 18 may allocate a plurality of touch periods M01 to M16 for driving the touch sensors C1 to C4 to one display frame displaying an input image. In embodiments disclosed herein, the touch driving device 18 may include a plurality of multiplexers respectively corresponding to the touch periods M01 to M16.

As shown in FIG. 6, when the display period and the touch period in one display frame are divided into the plurality of display periods Td1 and Td2 and the plurality of touch periods Tt1 and Tt2, respectively, the touch driving device 18 may sense a touch input in each of the plurality of touch periods Tt1 and Tt2 and transmit coordinate information of the touch input to the host system 19 at a time point, at which each touch frame is completed. Hence, the embodiment of the disclosure can further increase a touch report rate than a display frame rate. The display frame rate is a frame frequency at which image data of one frame is written to the pixel array. The touch report rate is a frequency, at which coordinate information of the touch input is generated. Because coordinate recognition time of the touch input shortens as the touch report rate becomes higher, touch sensitivity of the touch screen is improved.

The touch driving device 18 according to the embodiment of the disclosure may be implemented as an integrated circuit (IC) package shown in FIGS. 8 to 10.

Referring to FIG. 8, the touch driving device 18 includes a driver integrated circuit (IC) DIC and a touch IC TIC.

The driver IC DIC includes a touch sensor channel unit 100, a Vcom buffer 110, a switch array 120, a timing control signal generator 130, a multiplexer (MUX) 140, and a DTX compensation unit 150.

The touch sensor channel unit 100 is connected to electrodes of the touch sensors through the sensor lines and is connected to the Vcom buffer 110 and the multiplexer 140 through the switch array 120. The multiplexer 140 connects the sensor lines to the touch IC TIC. In case of a 1-to-3 multiplexer, the multiplexer 140 sequentially connects one channel of the touch IC TIC to the three sensor lines in the time-division manner and thus reduces the number of channels of the touch IC TIC. The multiplexer 140 sequentially selects the sensor lines to be connected to the channels of the touch IC TIC in response to MUX control signals MUXC1 to MUXC3. The multiplexer 140 is connected to the channels of the touch IC TIC through touch lines.

The Vcom buffer 110 outputs a common voltage Vcom of the pixel. The switch array 120 supplies the common voltage Vcom output from the Vcom buffer 110 to the touch sensor channel unit 100 under the control of the timing control signal generator 130 during the display period. The switch array 120 connects the sensor lines to the touch IC TIC under the control of the timing control signal generator 130 during the touch period.

The timing control signal generator 130 generates timing control signals for controlling operation timings of a display driving circuit and the touch IC TIC.

The timing control signal generator 130 of the driver IC DIC may be included in the timing controller 16 shown in FIG. 4. The timing control signal generator 130 drives the display driving circuit during the display period and drives the touch IC TIC during the touch period.

As shown in FIG. 6, the timing control signal generator 130 generates the touch enable signal TEN defining the display periods Td1 and Td2 and the touch periods Tt1 and Tt2 and synchronizes the display driving circuit with the touch IC TIC. The display driving circuit applies image data to the pixels during a first level period of the touch enable signal TEN. The touch IC TIC drives the touch sensors in response to a second level of the touch enable signal TEN and senses the touch input. A first level of the touch enable signal TEN may be a high level, and the second level of the touch enable signal TEN may be a low level, and vice versa.

The touch IC TIC is connected to a driving power unit (not shown) and receives driving power. The touch IC TIC generates the touch driving signal TS in response to the second level of the touch enable signal TEN and applies the touch driving signal TS to the touch sensors. The touch driving signal TS may be generated in various pulse shapes including a square wave, a sine wave, a triangle wave, etc. For example, the touch driving signal TS may be generated in the pulse shape of the square wave. The touch driving signal TS may be applied to each of the touch sensors N times, so that charges are accumulated on an integrator of the touch IC TIC N or more times, where N is a natural number equal to or greater than 2.

A noise of the touch driving signal may increase depending on changes in data of the input image. The DTX compensation unit 150 analyzes the data of the input image, removes a noise component from touch raw data depending on changes in a gray level of the input image, and transmits it to the touch IC TIC. In embodiments disclosed herein, "DTX" means Display and Touch crosstalk. The content related to the DTX compensation unit 150 is disclosed in detail in Republic of Korea Patent Application No. 10-2012-0149028 (Dec. 19, 2012) corresponding to the present applicant, and which are hereby incorporated by reference in their entirety. In case of a system, in which a noise of the touch sensor does not sensitively change depending on changes in data of the input image, the DTX compensation unit 150 is not necessary and thus may be omitted. In FIG. 8, "DTX DATA" is output data of the DTX compensation unit 150.

The touch IC TIC drives the multiplexer 140 in response to the touch enable signal TEN from the timing control signal generator 130 during the touch periods Tt1 and Tt2 and receives charges of the touch sensors through the multiplexer 140 and the sensor lines. In FIG. 8, MUXC1 to MUXC3 are MUX control signals selecting the channels of the multiplexer.

The touch IC TIC detects a change in charges before and after the touch input from the touch driving signal and compares the change in charges with a predetermined base line (i.e., a reference value). The touch IC TIC may determine a location of the touch sensors having a change in charges, which is equal to or greater than the base line, as an area of a finger touch input, and may determine a location of the touch sensors having a change in charges, which is less than the base line, as an area of a pen touch input. The touch IC TIC calculates coordinates of each of the touch inputs and transmits touch data TDATA(XY) including coordinate information of the touch inputs to the external host system 19. The touch IC TIC includes an amplifier amplifying charges of the touch sensor, an integrator accumulating charges received from the touch sensor, an analog-to-digital converter (ADC) converting a voltage of the integrator into digital data, and an arithmetic logic unit. The arithmetic logic unit compares touch raw data output from the ADC with the base line and determines the finger touch input or the pen touch input based on the result of a comparison. The arithmetic logic unit executes a touch recognition algorithm calculating coordinates.

The driver IC DIC and the touch IC TIC may transmit and receive signals through a serial peripheral interface (SPI).

The host system 19 means a system main body of an electronic device, to which the display device 10 according to the embodiment of the disclosure is applicable. The host system 19 may be one of a phone system, a television system, a set-top box, a navigation system, a DVD player, a Blu-ray player, a personal computer (PC), and a home theater system, and other systems that include or operate in conjunction with a display device. The host system 19 transmits data RGB of the input image to the driver IC DIC and receives touch input data TDATA(XY) from the touch IC TIC. The host system 19 executes an application associated with the touch input.

Referring to FIG. 9, the touch driving device 18 includes a driver IC DIC and a microcontroller unit (MCU).

The driver IC DIC includes a touch sensor channel unit 100, a Vcom buffer 110, a switch array 120, a first timing control signal generator 130, a multiplexer (MUX) 140, a DTX compensation unit 150, a sensing unit 160, a second timing control signal generator 170, and a memory 180. The driver IC DIC shown in FIG. 9 is different from the driver IC DIC shown in FIG. 8 in that the sensing unit 160 and the second timing control signal generator 170 are integrated inside the driver IC DIC. The first timing control signal generator 130 of FIG. 9 is substantially the same as the timing control signal generator 130 of FIG. 8. Thus, the first timing control signal generator 130 generates timing control signals for controlling operation timings of the display driving circuit and the touch IC TIC.

The multiplexer 140 floats touch sensor electrodes accessed by the sensing unit 160 under the control of the MCU. The sensing unit 160 accesses other touch sensor electrodes 22 except touch sensor electrodes connected to pixels charged with a data voltage. The multiplexer 140 may supply the common voltage Vcom under the control of the MCU. As shown in FIG. 11, when a resolution of the touch screen TSP (see FIG. 4) is M×N, the number of multiplexers 140 required for the resolution is M, where M and N are a positive integer equal to or greater than 2. When the resolution of the touch screen TSP is M×N, touch sensor electrodes 22 are divided into M×N electrodes. Each multiplexer 140 is connected to the N touch sensor electrodes 22 through N sensor lines 115 and sequentially connects the N sensor lines 115 to one sensing unit 160.

The sensing unit 160 is connected to the sensor lines 115 through the multiplexer 140. The sensing unit 160 measures a change in a waveform of the voltage received from the touch sensor electrodes 22 and converts the change into digital data. The sensing unit 160 includes an amplifier amplifying the received voltages of the touch sensor electrodes 22, an integrator accumulating the voltages of the amplifier, and an analog-to-digital converter (ADC) converting a voltage of the integrator into digital data. The digital data output from the ADC is touch raw data TDATA(XY) and is transmitted to the MCU. When the resolution of the touch screen TSP is M×N as shown in FIG. 9, the M sensing units 160 are necessary.

The second timing control signal generator 170 generates timing control signals and clocks for controlling operation timings of the multiplexer 140 and the sensing unit 160. The DTX compensation unit 150 may be omitted in the driver IC DIC. The memory 180 temporarily stores the touch raw data TDATA under the control of the second timing control signal generator 170.

The driver IC DIC and the MCU may transmit and receive signals through a serial peripheral interface (SPI). The MCU compares the touch raw data TDATA with a predetermined threshold value and determines a finger touch input or a pen touch input based on the result of a comparison. The MCU executes a touch recognition algorithm calculating coordinates of the finger touch input or the pen touch input.

Referring to FIG. 10, the touch driving device 18 includes a driver IC DIC and a memory MEM.

The driver IC DIC includes a touch sensor channel unit 100, a Vcom buffer 110, a switch array 120, a first timing control signal generator 130, a multiplexer 140, a DTX compensation unit 150, a sensing unit 160, a second timing control signal generator 170, a memory 180, and a MCU 190. The driver IC DIC shown in FIG. 10 is different from the driver IC DIC shown in FIG. 8 in that the MCU 190 is integrated inside the driver IC DIC. The MCU 190 compares touch raw data TDATA with a predetermined threshold value and determines a finger touch input or a pen touch input based on the result of a comparison. The MCU 190 executes a touch recognition algorithm calculating coordinates of the finger touch input or the pen touch input.

The memory MEM stores a register setting value related to timing information required in operations of the display driving circuit and the sensing unit 160. When the display device 10 is powered on, the register setting value is loaded from the memory MEM to the first timing control signal generator 130 and the second timing control signal generator 170. The first timing control signal generator 130 and the second timing control signal generator 170 generate timing control signals for controlling the display driving circuit and the sensing unit 160 based on the register setting value read from the memory MEM. The embodiment of the disclosure can respond to changes in a model of a driving device without change in a structure of the driving device by changing the register setting value of the memory MEM.

The display module may include the display panel DIS, the display driving circuit (12, 14, and 16), and the host system 19.

The display panel DIS includes a liquid crystal layer between an upper substrate and a lower substrate. The pixel array of the display panel DIS includes pixels formed in pixel areas defined by data lines D1 to Dm and gate lines G1 to Gn, where m and n are a positive integer. Each pixel may include thin film transistors (TFTs) formed at crossings of the data lines D1 to Dm and the gate lines G1 to Gn, a pixel electrode charged with the data voltage, a storage capacitor which is connected to the pixel electrode and holds a voltage of a liquid crystal cell, and the like.

Black matrixes, color filters, etc. may be formed on the upper substrate of the display panel DIS. The lower substrate of the display panel DIS may be configured in a COT (color filter on TFT) structure. In this instance, the black matrixes and the color filters may be formed on the lower substrate of the display panel DIS. A common electrode supplied with the common voltage Vcom may be formed on the upper substrate or the lower substrate of the display panel DIS. Polarizing plates are respectively attached to the upper substrate and the lower substrate of the display panel DIS. Alignment layers for setting a pre-tilt angle of liquid crystals are respectively formed on the inner surfaces contacting the liquid crystals in the upper substrate and the lower substrate of the display panel DIS. A column spacer is formed between the upper substrate and the lower substrate of the display panel DIS to keep cell gaps of the liquid crystal cells constant.

A backlight unit may be disposed under a back surface of the display panel DIS. The backlight unit may be implemented as one of an edge type backlight unit and a direct type backlight unit and irradiates light onto the display panel DIS. The display panel DIS may be implemented in any known mode including a twisted nematic (TN) mode, a vertical alignment (VA) mode, an in-plane switching (IPS) mode, a fringe field switching (FFS) mode, etc.

The display driving circuit includes a data driving circuit 12, a gate driving circuit 14, and the timing controller 16. The display driving circuit applies video data of an input image to the pixels of the display panel DIS. The data driving circuit 12 converts digital video data RGB received from the timing controller 16 into positive and negative analog gamma compensation voltages and outputs the data voltage. The data driving circuit 12 then supplies the data voltage to display pixels via the data lines D1 to Dm. The gate driving circuit 14 sequentially supplies gate pulses (or referred to as "scan pulses") synchronized with the data voltages to the gate lines G1 to Gn and selects pixel lines of the display panel DIS to which the data voltages are applied. The gate driving circuit 14 may be disposed on the substrate of the display panel DIS together with the pixels.

The timing controller 16 receives timing signals, such as a vertical sync signal Vsync, a horizontal sync signal Hsync, a data enable signal DE, and a main clock MCLK, from the host system 19. The timing controller 16 synchronizes operation timings of the data driving circuit 12 and the gate driving circuit 14 with each other. The timing controller 16 generates a data timing control signal and a scan timing control signal for respectively controlling the operation timings of the data driving circuit 12 and the gate driving circuit 14 using the timing signals. The data timing control signal includes a source sampling clock SSC, a source output enable signal SOE, a polarity control signal POL, and the like. The scan timing control signal includes a gate start pulse GSP, a gate shift clock GSC, a gate output enable signal GOE, and the like.

The host system 19 transmits the digital video data RGB and the timing signals Vsync, Hsync, DE, and MCLK to the timing controller 16. Further, the host system 19 may execute an application associated with touch coordinate information (XY) received from the touch driving device 18.

The touch enable signal TEN of FIG. 6 may be generated in the host system 19. During the display periods Td1 and Td2, the data driving circuit 12 supplies the data voltage to the data lines D1 to Dm under the control of the timing controller 16, and the gate driving circuit 14 sequentially supplies the gate pulses synchronized with the data voltage to the gate lines G1 to Gn under the control of the timing controller 16. During the display periods Td1 and Td2, the touch driving device 18 stops operating.

During the touch periods Tt1 and Tt2, the touch driving device 18 applies the touch sensor driving signal TS to the touch sensors of the touch screen TSP. During the touch periods Tt1 and Tt2, the display driving circuit (12, 14, and 16) may supply an AC signal having the same amplitude and the same phase as the touch driving signal TS to the signal lines D1 to Dm and G1 to Gn, in order to minimize a parasitic capacitance between the signal lines D1 to Dm and G1 to Gn connected to the pixels and the touch sensors. In this instance, a display noise mixed with the touch driving signal TS is greatly reduced, and the accuracy of the touch sensing increases.

[Stylus Pen]

Figure 12:
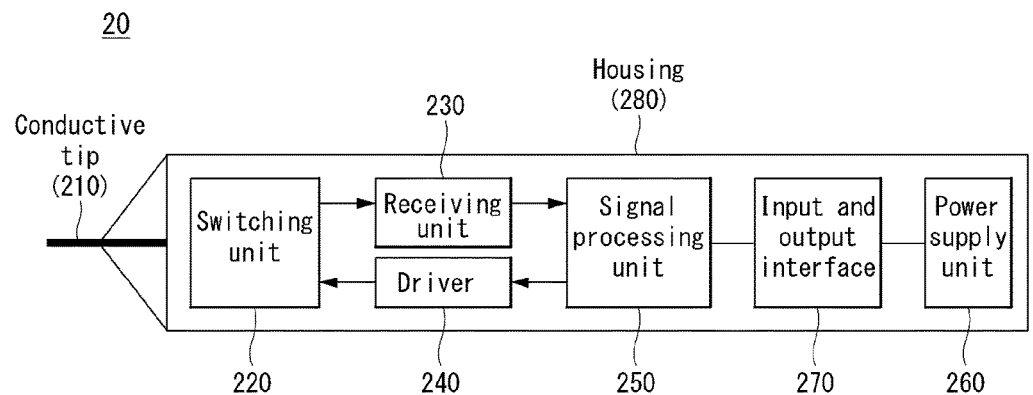
FIG. 12 illustrates internal configuration of an active stylus pen according to an embodiment of the disclosure.

FIG. 12 illustrates internal configuration of an active stylus pen according to an embodiment of the disclosure.

Referring to FIG. 12, an active stylus pen 20 includes a housing 280, a conductive tip 210 protruding to the outside of one side of the housing 280, a switching unit 220 connected to the conductive tip 210 inside the housing 280, a receiving unit 230 receiving a touch driving signal TS from the conductive tip 210 through the switching unit 220, a signal processing unit 250 generating a pen transmission signal including pen additional information based on the touch driving signal TS from the receiving unit 230, a driver 240 that level-shifts a level of the pen transmission signal generated by the signal processing unit 250 to an analog level and then supplies the level-shifted signal to the conductive tip 210 through the switching unit 220, a power supply unit 260 generating driving power required in an operation of the active stylus pen 20, and an input and output interface 270.

The conductive tip 210 may be made of a conductive material such as metal and serves as a receiving electrode and a transmitting electrode. When the conductive tip 210 contacts the touch screen TSP of the display device 10, the conductive tip 210 is coupled with the touch screen TSP at a contact position. After the conductive tip 210 receives the touch driving signal TS from the touch screen TSP at the contact position, the conductive tip 210 transmits the pen transmission signal generated inside the active stylus pen 20 to the contact position of the touch screen TSP so that the pen transmission signal is synchronized with the touch driving signal TS.

When the conductive tip 210 contacts the touch screen TSP of the display device 10, the switching unit 220 electrically connects the conductive tip 210 to the receiving unit 230 for a reception time and then electrically connects the conductive tip 210 to the driver 240 for a transmission time, thereby temporally separating a reception timing of the touch driving signal and a transmission timing of the pen transmission signal. Because the conductive tip 210 serves as both the receiving electrode and the transmitting electrode, the structure of the active stylus pen 20 can be simplified.

The receiving unit 230 includes at least one amplifier and can amplify the touch driving signal received from the conductive tip 210 through the switching unit 220. The receiving unit 230 includes a comparator and compares the amplified signal with a predetermined reference voltage to output the result of a comparison to the signal processing unit 250.

The signal processing unit 250 generates the pen transmission signal based on the touch driving signal received from the receiving unit 230. To this end, the signal processing unit 250 includes a first signal processing unit for dividing a touch period and a second signal processing unit for generating the pen transmission signal. The first signal processing unit may recognize a plurality of touch periods based on the touch driving signals received from the touch screen. The second signal processing unit generates the pen transmission signal corresponding to each touch period. The signal processing unit 250 outputs the generated pen transmission signal to the driver 240.

The driver 240 includes a level-shifter and shifts a level of the pen transmission signal from a digital level to an analog level. The driver 240 outputs the level-shifted pen transmission signal to the conductive tip 210 through the switching unit 220.

The input and output interface 270 is connected to the power supply unit 260 and can supply electric power necessary for the receiving unit 230, the driver 240, and the signal processing unit 250.

Figure 13:
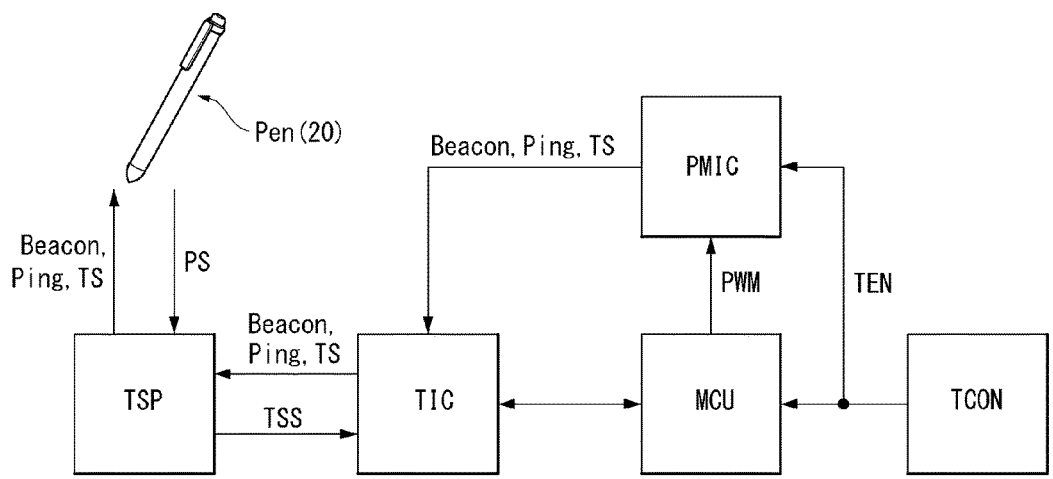
FIG. 13 illustrates detailed configuration of a sensing mode switching block according to an embodiment of the disclosure.
Figure 14:
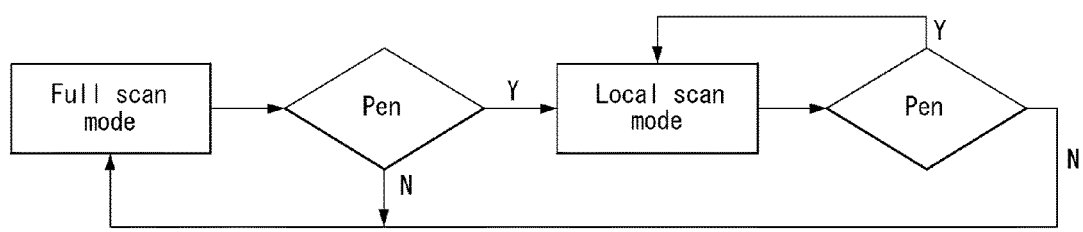
FIG. 14 schematically illustrates a sensing mode switching method according to an embodiment of the disclosure.

FIG. 13 illustrates detailed configuration of a sensing mode switching block according to an embodiment of the disclosure. FIG. 14 schematically illustrates a sensing mode switching method according to an embodiment of the disclosure.

Referring to FIGS. 13 and 14, the touch sensing system according to the embodiment of the disclosure includes a timing controller TCON, a microcontroller unit (MCU), a power IC PMIC, a touch IC TIC, a touch screen TSP, and an active stylus pen 20, in order to switch a sensing mode.

The timing controller TCON generates a touch enable signal TEN and time-divides one display frame into a plurality of touch periods and a plurality of display periods.

The MCU divides a sensing mode of touch sensors into a full scan mode and a local scan mode. In embodiments disclosed herein, the full scan mode is a sensing mode that requires the sensing of the entire area of the touch screen TSP to complete one finger touch frame. On the other hand, the local scan mode is a sensing mode that requires the sensing of a portion of the touch screen TSP to complete one pen touch frame. Even in the local scan mode, a finger touch input may be sensed. In this instance, it is necessary to sense the entire area of the touch screen TSP so as to complete one finger touch frame.

The MCU generates a pulse width modulation (PWM) signal necessary for the sensing. The PWM signal corresponds to a transistor-transistor logic (TTL) voltage level of each of a first sync signal Beacon, a second sync signal Ping, and a touch driving signal TS.

As shown in FIG. 14, when a pen touch sensing signal is sensed during the full scan mode, the MCU may switch a sensing mode of the touch sensors from the full scan mode to the local scan mode. Further, as shown in FIG. 14, when the pen touch sensing signal is not sensed during the local scan mode, the MCU may switch the sensing mode of the touch sensors from the local scan mode to the full scan mode. Because a magnitude of a finger touch sensing signal resulting from a finger touch input and a magnitude of a pen touch sensing signal resulting from a pen touch input appear in opposite directions based on a predetermined reference value, the MCU can determine whether or not the pen touch input is performed based on an output magnitude of a touch sensing signal TSS (i.e., the finger touch sensing signal and the pen touch sensing signal).

The power IC PMIC receives the PWM signal from the MCU and level-shifts the PWM signal to generate the first sync signal Beacon, the second sync signal Ping, and the touch driving signal TS. The first sync signal Beacon may be allocated to at least one of the plurality of touch periods, and the second sync signal Ping may be allocated to a portion of each touch period. The touch driving signal TS may be allocated to a remaining portion of each touch period.

The touch IC TIC supplies the first sync signal Beacon, the second sync signal Ping, and the touch driving signal TS received from the power IC PMIC to the touch screen TSP. The active stylus pen 20 contacts the touch screen TSP and receives the first sync signal Beacon, the second sync signal Ping, and the touch driving signal TS from the touch screen TSP. The active stylus pen 20 synchronizes a pen transmission signal PS with the touch driving signal TS based on the first sync signal Beacon and the second sync signal Ping and outputs the pen transmission signal PS at the contact position between the active stylus pen 20 and the touch screen TSP.

The touch IC TIC can sense a finger touch input of the touch sensors through the touch periods in the full scan mode and can time-division sense a finger touch input and a pen touch input of the touch sensors through the touch periods in the local scan mode. The touch IC TIC can supply the touch sensing signal TSS (i.e., the finger touch sensing signal and the pen touch sensing signal) obtained from the sensing result to the MCU.

In the full scan mode, the touch IC TIC divides the finger touch input of the touch sensors into a plurality of areas and senses the finger touch input. Hence, the touch IC TIC can sense all the touch sensors on the touch screen TSP. In this instance, the plurality of areas may correspond to the touch periods.

In the local scan mode, the touch IC TIC can sense only a pen touch input of some of the plurality of touch sensors including a position of the pen touch input. In this instance, the touch IC TIC can sense not all the touch sensors on the touch screen TSP but the touch sensors disposed in a portion of the touch screen TSP.

The pen touch sensing signal may include pen position information indicating a contact position of the touch sensors contacting the stylus pen 20, and pen additional information indicating an additional function of the stylus pen 20. In embodiments disclosed herein, the pen additional information may include pen pressure information indicating a pressure when the stylus pen 20 contacts the touch sensors, button status information indicating whether or not at least one functional button that is included in the stylus pen 20 and performs a specific function is activated, pen identification information for distinguishing from other active stylus pens, and the like.

In the local scan mode, the touch IC TIC can sense the pen touch input through first touch periods for the pen position information and second touch periods for the pen additional information among the plurality of touch periods.

In the local scan mode, the touch IC TIC can divide the finger touch input of the touch sensors into a plurality of areas and sense the finger touch input through third touch periods for finger position information among the plurality of touch periods. In this instance, the plurality of areas may correspond to the third touch periods.

Figure 16:
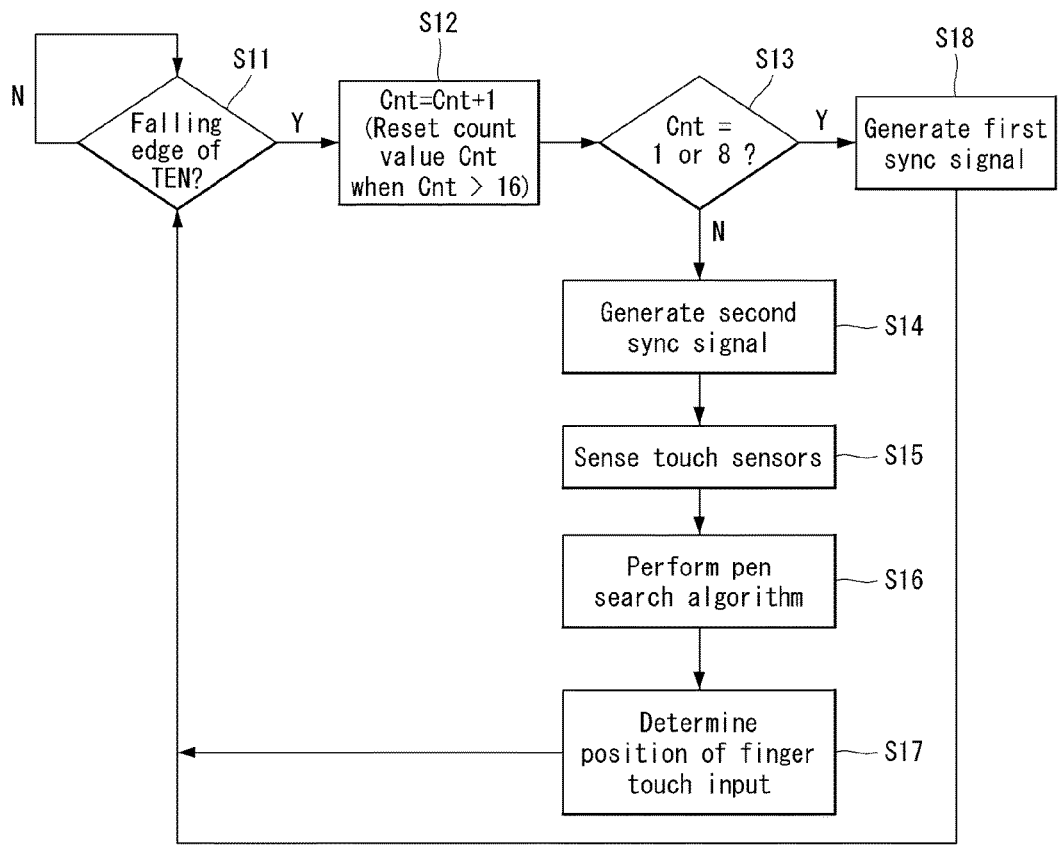
FIG. 16 illustrates in detail an operation process of a full scan mode according to an embodiment of the disclosure.
Figure 17A:
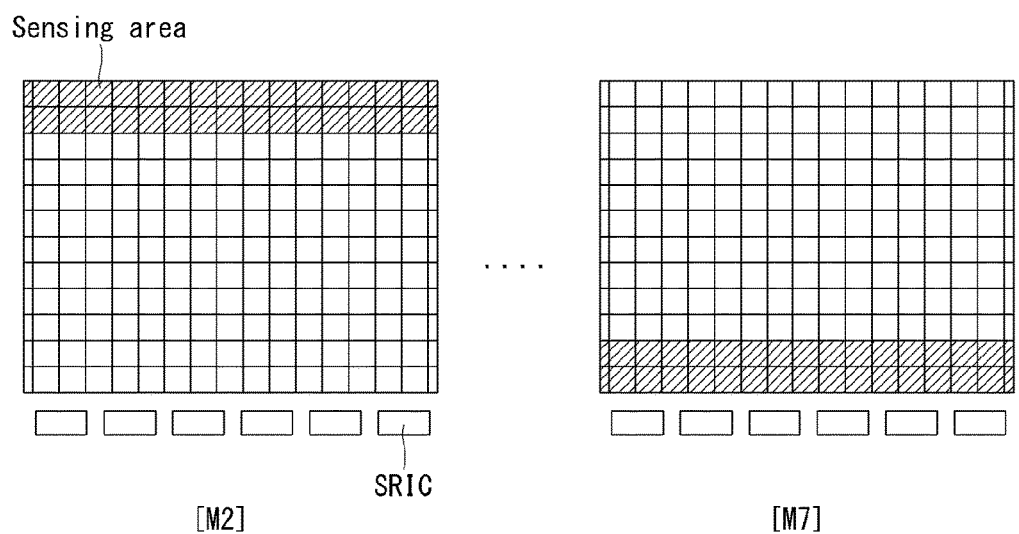
FIGS. 17A and 17B illustrate a sensing area corresponding to a finger touch period of one display frame in a full scan mode according to an embodiment of the disclosure.
Figure 17B:
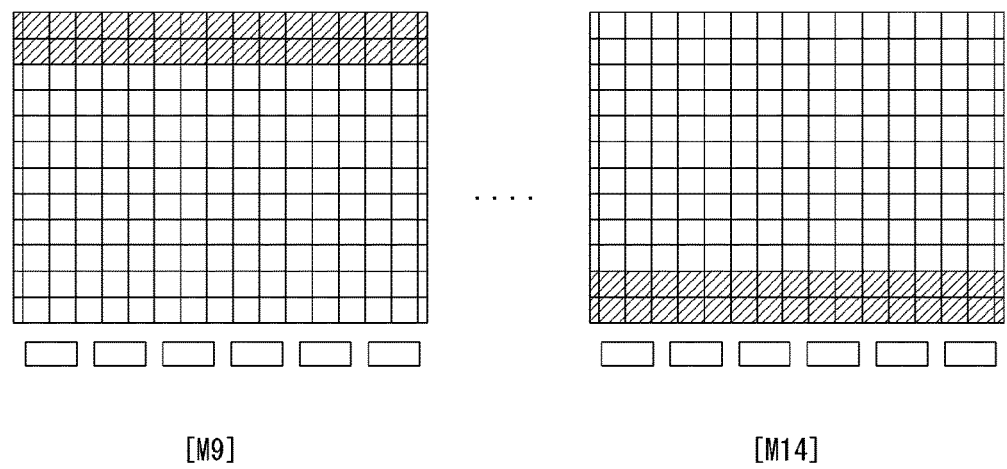

FIG. 15 illustrates a sensing signal obtained in each touch period of one display frame in a full scan mode. FIG. 16 illustrates in detail an operation process of a full scan mode. FIGS. 17A and 17B illustrate a sensing area corresponding to a finger touch period of one display frame in a full scan mode. In FIG. 17A, "SRIC" denotes a combined IC configured to combine a source driver IC and a touch IC.

In FIG. 15, "LHB" denotes a touch period in which a touch sensing operation is performed, and a plurality of touch periods M1 to M16 may be included in one display frame. In the full scan mode, finger touch sensing signals Finger1 to Finger6 obtained through the touch periods M2 to M7 may form a first finger touch frame, and finger touch sensing signals Finger1 to Finger6 obtained through the touch periods M9 to M14 may form a second finger touch frame. However, embodiments are not limited thereto. The first sync signal Beacon for synchronizing the first finger touch frame may be allocated to the touch period M1, and the first sync signal Beacon for synchronizing the second finger touch frame may be allocated to the touch period M8. The second sync signal Ping for synchronizing each of the plurality of touch periods M1 to M16 may be allocated to each of the plurality of touch periods M1 to M16. In FIG. 15, the touch periods M15 and M16 are dummy touch periods and may be omitted if necessary or desired.

An operation process of the full scan mode is described below with reference to FIGS. 15 to 17B. As shown in FIG. 7, because start timings of the touch periods M1 to M16 are respectively synchronized with falling edges of pulses of the touch enable signal TEN, the touch sensing system according to the embodiment of the disclosure can determine the touch periods M1 to M16 based on a count value Cnt of the falling edges of the touch enable signal TEN in step S11. Each time the count value Cnt of the falling edges of the touch enable signal TEN exceeds 16, the embodiment of the disclosure resets the count value Cnt in step S12.

Each time the count value Cnt of the falling edges of the touch enable signal TEN is 1 or 8, the embodiment of the disclosure generates the first sync signal Beacon and controls start timing of one finger touch frame in step S18.

When the count value Cnt of the falling edges of the touch enable signal TEN is not 1 or 8, the embodiment of the disclosure generates the second sync signal Ping and allocates the second sync signal Ping to the corresponding touch periods M2 to M7 and M9 to M14 in steps S13 and S14. The embodiment of the disclosure senses the touch sensors in the corresponding touch periods M2 to M7 and M9 to M14 and generates the finger touch sensing signals Finger1 to Finger6 in step S15. In this instance, the embodiment of the disclosure may divide the touch screen TSP into six parts corresponding to the touch periods M2 to M7 or M9 to M14 and sense the touch sensors on the touch screen TSP. For example, as shown in FIG. 17A, in the touch period M2, the embodiment of the disclosure may sense the touch sensors that are in a first area of the touch screen TSP, and generate the finger touch sensing signal Finger1. Further, in the touch period M7, the embodiment of the disclosure may sense the touch sensors that are in a sixth area of the touch screen TSP, and generate the finger touch sensing signal Finger7. In the same manner as FIG. 17A, as shown in FIG. 17B, in the touch period M9, the embodiment of the disclosure may sense the touch sensors that are in the first area of the touch screen TSP, and generate the finger touch sensing signal Finger1. Further, in the touch period M14, the embodiment of the disclosure may sense the touch sensors that are in the sixth area of the touch screen TSP, and generate the finger touch sensing signal Finger7.

The embodiment of the disclosure determines whether or not the pen touch input is sensed using a predetermined pen search algorithm in step S16. When there is no pen touch input, the embodiment of the disclosure applies the finger touch sensing signals Finger1 to Finger6 to a finger touch algorithm and determines a position of the finger touch input in step S17. The embodiment of the disclosure implements a multi-touch algorithm including the pen search algorithm and the finger touch algorithm. When the pen touch input is sensed, the embodiment of the disclosure switches the sensing mode from the full scan mode to the local scan mode.

Figure 19:
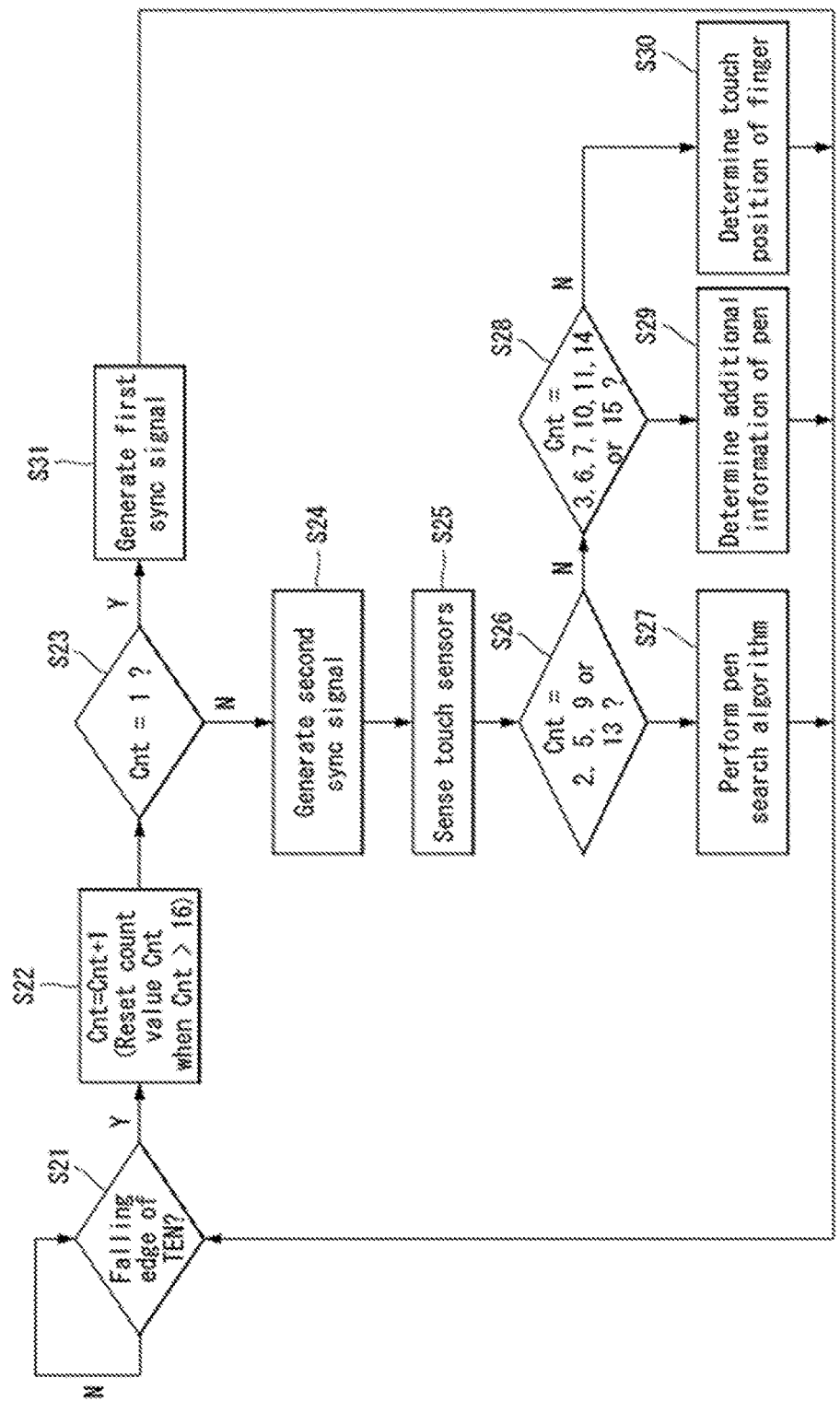
FIG. 19 illustrates in detail an operation process of a local scan mode according to an embodiment of the disclosure.
Figure 20A:
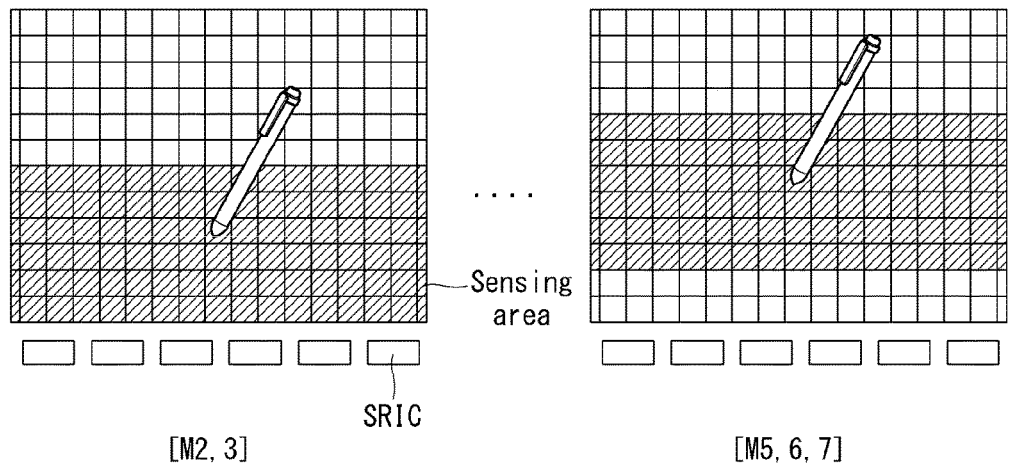
FIGS. 20A and 20B illustrate a sensing area corresponding to a pen touch period of one display frame in a local scan mode according to an embodiment of the disclosure.
Figure 20B:
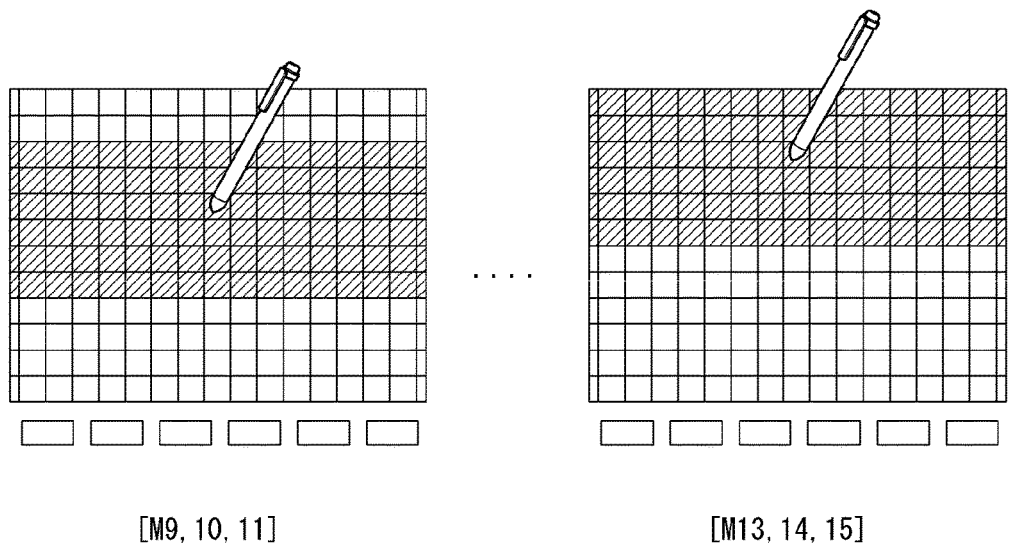
Figure 21A:
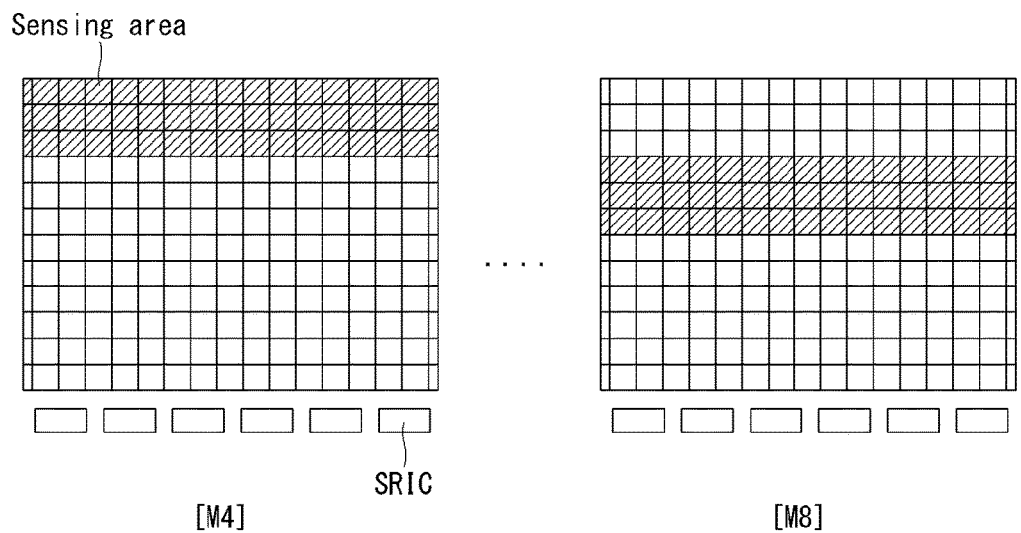
FIGS. 21A and 21B illustrate a sensing area corresponding to a finger touch period of one display frame in a local scan mode according to an embodiment of the disclosure.
Figure 21B:
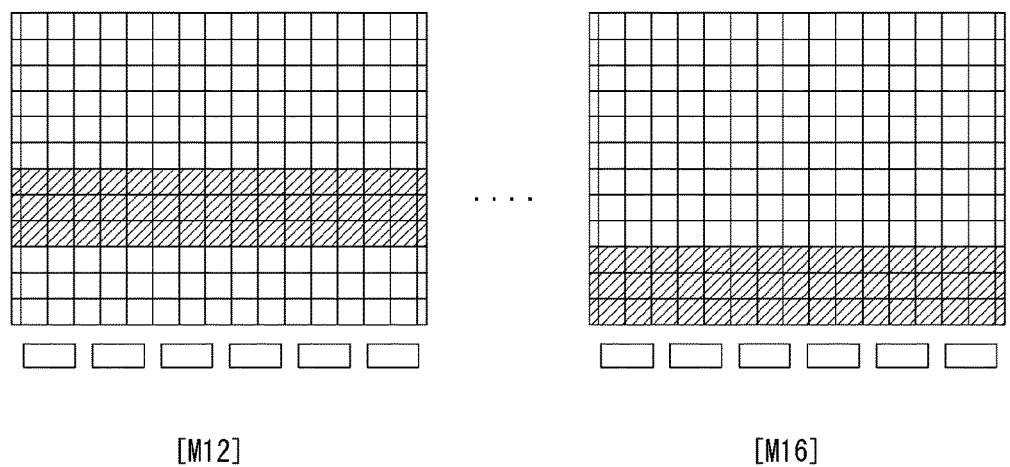

FIG. 18 illustrates a sensing signal obtained in each touch period of one display frame in a local scan mode. FIG. 19 illustrates in detail an operation process of a local scan mode. FIGS. 20A and 20B illustrate a sensing area corresponding to a pen touch period of one display frame in a local scan mode. FIGS. 21A and 21B illustrate a sensing area corresponding to a finger touch period of one display frame in a local scan mode. In FIGS. 20A and 21A, "SRIC" denotes a combined IC configured to combine a source driver IC and a touch IC.

In FIG. 18, "LHB" denotes a touch period in which a touch sensing operation is performed, and a plurality of touch periods M1 to M16 may be included in one display frame. In FIG. 18, "Pen1 to Pen4" denotes pen position information indicating a contact position of the touch sensors contacting the pen, and "Data1 to Data7" denotes pen additional information indicating an additional function of the pen.

In the local scan mode, the pen touch sensing signals Pen1 and Data1 obtained through the touch periods M2 and M3 may form a first pen touch frame; the pen touch sensing signals Pen2, Data2, and Data3 obtained through the touch periods M5 to M7 may form a second pen touch frame; the pen touch sensing signals Pen3, Data4, and Data5 obtained through the touch periods M9 to M11 may form a third pen touch frame; and the pen touch sensing signals Pen4, Data6, and Data7 obtained through the touch periods M13 to M15 may form a fourth pen touch frame. In the local scan mode, finger touch sensing signals Finger1 to Finger4 obtained through the touch periods M4, M8, M12, and M16 may form a finger touch frame.

In the local scan mode, when a finger touch input of the touch sensors and a pen touch input of the touch sensors are time-division sensed, the embodiment of the disclosure can minimize data interference between the pen touch sensing signal and the finger touch sensing signal. Further, the embodiment of the disclosure can further increase a pen touch report rate than a finger touch report rate and thus greatly improve a touch sensing performance of the pen.

The first sync signal Beacon for synchronizing one display frame may be allocated to the touch period M1. The second sync signal Ping for synchronizing each of the plurality of touch periods M1 to M16 may be allocated to each of the touch periods M1 to M16.

An operation process of the local scan mode is described below with reference to FIGS. 18 to 21B. As shown in FIG. 7, because start timings of the touch periods M1 to M16 are respectively synchronized with falling edges of pulses of the touch enable signal TEN, the touch sensing system according to the embodiment of the disclosure can determine the touch periods M1 to M16 based on a count value Cnt of the falling edges of the touch enable signal TEN in step S21. Each time the count value Cnt of the falling edges of the touch enable signal TEN exceeds 16, the embodiment of the disclosure resets the count value Cnt in step S22.

Each time the count value Cnt of the falling edges of the touch enable signal TEN is 1, the embodiment of the disclosure generates the first sync signal Beacon and controls start timing of one finger touch frame in step S31.

When the count value Cnt of the falling edges of the touch enable signal TEN is not 1, the embodiment of the disclosure generates the second sync signal Ping, allocates the second sync signal Ping to the corresponding touch periods M2 to M16, and senses the touch sensors in the corresponding touch periods M2 to M16 in steps S23 and S25.

Each time the count value Cnt of the falling edges of the touch enable signal TEN is 2, 5, 9 or 13, the embodiment of the disclosure senses the touch sensors in the corresponding touch period M2, M5, M9 or M13, obtains the pen position information Pen' to Pen4, and applies the pen position information Pen' to Pen4 to a predetermined pen position algorithm, thereby determining a touch position of the pen in steps S26 and S27. Further, each time the count value Cnt of the falling edges of the touch enable signal TEN is 3, 6, 7, 10, 11, 14 or 15, the embodiment of the disclosure senses the touch sensors in the corresponding touch period M3, M6, M7, M10, M11, M14 or M15, obtains the pen additional information Data1 to Data7, and applies the pen additional information Data1 to Data7 to a predetermined pen information algorithm, thereby determining additional information of the pen in steps S28 and S29.

More specifically, the embodiment of the disclosure may divide the touch screen into four parts and sense the touch screen TSP so that the touch screen TSP corresponds to the corresponding touch periods M2, M5, M9 and M13. For example, as shown in FIG. 20A, in the touch periods M2 and M3, the embodiment of the disclosure may sense the touch sensors that are in a first area of the touch screen TSP including a pen touch input position, and generate the pen touch sensing signals Pen' and Data1. Further, in the touch periods M5, M6 and M7, the embodiment of the disclosure may sense the touch sensors that are in a second area of the touch screen TSP including the pen touch input position, and generate the pen touch sensing signals Pen2, Data2, and Data3. In the same manner as FIG. 20A, as shown in FIG. 20B, in the touch periods M9, M10 and M11, the embodiment of the disclosure may sense the touch sensors that are in a third area of the touch screen TSP including the pen touch input position, and generate the pen touch sensing signals Pen3, Data4, and Data5. Further, in the touch periods M13, M14 and M15, the embodiment of the disclosure may sense the touch sensors that are in a fourth area of the touch screen TSP including the pen touch input position, and generate the pen touch sensing signals Pen4, Data6, and Data7.

Each time the count value Cnt of the falling edges of the touch enable signal TEN is 4, 8, 12 or 16 (i.e., when the count value Cnt of the falling edges of the touch enable signal TEN does not satisfy the conditions of the step S26 and S28), the embodiment of the disclosure senses the touch sensors in the corresponding touch period M4, M8, M12 or M16, obtains the finger touch sensing signals Finger1 to Finger4, and applies the finger touch sensing signals Finger1 to Finger4 to a predetermined finger touch algorithm, thereby determining a touch position of the finger in step S30. The embodiment of the disclosure implements a multi-touch algorithm including the pen search algorithm, the pen information algorithm, and the finger touch algorithm.

In this instance, the embodiment of the disclosure may divide the touch screen into four parts and sense the touch screen TSP so that the touch screen TSP corresponds to the touch periods M4, M8, M12 and M16. For example, as shown in FIG. 21A, in the touch period M4, the embodiment of the disclosure may sense the touch sensors that are in the first area of the touch screen TSP, and generate the finger touch sensing signal Finger1. Further, in the touch period M8, the embodiment of the disclosure may sense the touch sensors that are in the second area of the touch screen TSP, and generate the finger touch sensing signal Finger2. In the same manner as FIG. 21A, as shown in FIG. 21B, in the touch period M12, the embodiment of the disclosure may sense the touch sensors that are in the third area of the touch screen TSP, and generate the finger touch sensing signal Finger3. Further, in the touch period M16, the embodiment of the disclosure may sense the touch sensors that are in the fourth area of the touch screen TSP, and generate the finger touch sensing signal Finger4.

The embodiment of the disclosure determines whether or not the pen touch input is performed using the predetermined pen search algorithm. When there is no pen touch input, the embodiment of the disclosure switches the sensing mode from the local scan mode to the full scan mode.

As described above, the embodiments of the disclosure perform the time-division on the touch periods for sensing the pen position information, the pen additional information, and the finger position information when sensing the touch input of the active stylus pen and the touch input of the finger with respect to the touch screen, thereby minimizing data interference between the pen touch sensing signal and the finger touch sensing signal and increasing the touch sensing performance.

Furthermore, the embodiments of the disclosure sense only a touch area of the touch screen touched with the pen when sensing the touch input of the active stylus pen with respect to the touch screen, thereby obtaining the pen touch sensing signal for a short period of time and increasing the pen touch report rate.

Although various embodiments have been described with reference to a number of illustrative embodiments thereof, numerous other modifications and embodiments may be devised by those skilled in the art that will fall within the scope of the principles of this disclosure. In particular, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch sensing system comprising:
a touch screen integrated display panel provided with a plurality of touch sensors and a plurality of pixels;
a timing controller configured to time-divide one display frame into a plurality of touch periods and a plurality of display periods;
a microcontroller unit configured to divide a sensing mode of the plurality of touch sensors into a full scan mode and a local scan mode; and
a touch integrated circuit (IC) configured to sense a finger touch input of the touch sensors through the touch periods in the full scan mode and time-division sense a finger touch input and a pen touch input of the touch sensors through the touch periods in the local scan mode,
wherein the microcontroller unit generates pulse width modulation (PWM) signals respectively corresponding to a first sync signal, a second sync signal, and a touch driving signal,
wherein the first sync signal is allocated to a first touch period of the plurality of touch periods,
wherein the second sync signal is allocated to a first portion of a second touch period of the plurality of touch periods, and
wherein the touch drive signal is allocated to a second portion of the second touch period of the plurality of touch periods.

2. The touch sensing system of claim 1, wherein a magnitude of a finger touch sensing signal resulting from the finger touch input and a magnitude of a pen touch sensing signal resulting from the pen touch input appear in opposite directions based on a predetermined reference value.

3. The touch sensing system of claim 2, wherein the microcontroller unit:
switches the sensing mode of the touch sensors from the full scan mode to the local scan mode when the pen touch sensing signal is sensed during the full scan mode; and
switches the sensing mode of the touch sensors from the local scan mode to the full scan mode when the pen touch sensing signal is not sensed during the local scan mode.

4. The touch sensing system of claim 3, wherein in the full scan mode, the touch IC divides the finger touch input of the touch sensors into a plurality of areas and senses the finger touch input,
wherein the plurality of areas corresponds to the touch periods.

5. The touch sensing system of claim 3, wherein in the local scan mode, the touch IC senses only the pen touch input of some of the plurality of touch sensors including a position of the pen touch input.

6. The touch sensing system of claim 5, wherein the pen touch sensing signal includes:
pen position information indicating a contact position of the touch sensors contacting a pen; and
pen additional information indicating an additional function of the pen,
wherein the pen additional information includes pen pressure information when the pen contacts the touch sensors, button status information indicating whether or not at least one functional button that is included in the pen and performs a specific function is activated, and pen identification information for distinguishing from other pens.

7. The touch sensing system of claim 6, wherein in the local scan mode, the touch IC senses the pen touch input through touch periods for the pen position information and touch periods for the pen additional information among the plurality of touch periods.

8. The touch sensing system of claim 7, wherein in the local scan mode, the touch IC divides the finger touch input of the touch sensors into a plurality of areas and senses the finger touch input through touch periods for finger position information among the plurality of touch periods,
wherein the plurality of areas corresponds to the touch periods for the finger position information.

9. A method of driving a touch sensing system including a touch screen integrated display panel provided with a plurality of touch sensors and a plurality of pixels, the method comprising:

time-dividing one display frame into a plurality of touch periods and a plurality of display periods;
dividing a sensing mode of the plurality of touch sensors into a full scan mode and a local scan mode;
sensing a finger touch input of the touch sensors through the touch periods in the full scan mode and time-division sensing a finger touch input and a pen touch input of the touch sensors through the touch periods in the local scan mode, and
generating pulse width modulation (PWM) signals respectively corresponding to a first sync signal, a second sync signal, and a touch driving signal,
wherein the first sync signal is allocated to a first touch period of the plurality of touch periods,
wherein the second sync signal is allocated to a first portion of a second touch period of the plurality of touch periods, and
wherein the touch driving signal is allocated to a second portion of the second touch period of the plurality of touch periods.

10. The method of claim 9, wherein a magnitude of a finger touch sensing signal resulting from the finger touch input and a magnitude of a pen touch sensing signal resulting from the pen touch input appear in opposite directions based on a predetermined reference value.

11. The method of claim 10, further comprising:
switching the sensing mode of the touch sensors from the full scan mode to the local scan mode when the pen touch sensing signal is sensed during the full scan mode; and
switching the sensing mode of the touch sensors from the local scan mode to the full scan mode when the pen touch sensing signal is not sensed during the local scan mode.

12. The method of claim 11, wherein in the full scan mode, the finger touch input of the touch sensors is divided into a plurality of areas and is sensed,
wherein the plurality of areas corresponds to the touch periods.

13. The method of claim 11, wherein in the local scan mode, only the pen touch input of some of the plurality of touch sensors including a position of the pen touch input is sensed.

14. The method of claim 13, wherein the pen touch sensing signal includes:
pen position information indicating a contact position of the touch sensors contacting a pen; and
pen additional information indicating an additional function of the pen,
wherein the pen additional information includes pen pressure information when the pen contacts the touch sensors, button status information indicating whether or not at least one functional button that is included in the pen and performs a specific function is activated, and pen identification information for distinguishing from other pens.

15. The method of claim 11, wherein in the local scan mode, the pen touch input is sensed through touch periods for the pen position information and touch periods for the pen additional information among the plurality of touch periods.

16. The method of claim 15, wherein in the local scan mode, the finger touch input of the touch sensors is divided into a plurality of areas, and the finger touch input is sensed through touch periods for finger position information among the plurality of touch periods,
wherein the plurality of areas corresponds to the touch periods for the finger position information.

* * * * *